(12) United States Patent
Yang et al.

(10) Patent No.: US 11,218,956 B2
(45) Date of Patent: Jan. 4, 2022

(54) NETWORK MANAGEMENT METHOD AND SYSTEM

(71) Applicant: HUAWEI TECHNOLOGIES CO., LTD., Guangdong (CN)

(72) Inventors: Shuigen Yang, Shanghai (CN); Wenqi Sun, Shenzhen (CN); Wei Lu, Shenzhen (CN); Wei Tan, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 19 days.

(21) Appl. No.: 16/783,395

(22) Filed: Feb. 6, 2020

(65) Prior Publication Data

US 2020/0178168 A1 Jun. 4, 2020

Related U.S. Application Data

(63) Continuation of application No. PCT/CN2018/095133, filed on Jul. 10, 2018.

(30) Foreign Application Priority Data

Aug. 11, 2017 (CN) .......................... 201710687802.8

(51) Int. Cl.
*H04W 48/18* (2009.01)
*H04W 76/11* (2018.01)
(Continued)

(52) U.S. Cl.
CPC ........ *H04W 48/18* (2013.01); *G06F 9/45558* (2013.01); *H04W 8/08* (2013.01);
(Continued)

(58) Field of Classification Search
CPC ..... H04W 48/18; H04W 76/11; H04W 76/10; H04W 48/16; H04W 8/08; H04W 24/02;
(Continued)

(56) References Cited

U.S. PATENT DOCUMENTS 9,172,678 B2 10/2015 Wang et al.
2013/0007232 A1 1/2013 Wang et al.
(Continued)

FOREIGN PATENT DOCUMENTS

CN 106341832 A 1/2017
CN 106550410 A 3/2017

OTHER PUBLICATIONS

Huawei et al., "TS 23.501: S-NSSAI and Network slice instance", 3GPP TSG SA WG2 Meeting #120, S2-172063, Mar. 27-31, 2017, Busan, 3 pages.
(Continued)

*Primary Examiner* — Meless N Zewdu
(74) *Attorney, Agent, or Firm* — Fish & Richardson P.C.

(57) ABSTRACT

The present disclosure relates to network management methods. One example method includes obtaining, by a network slice selection function (NSSF), a configuration parameter sent by a network slice management and orchestration module (NSMAO), where the configuration parameter includes a correspondence, the correspondence includes at least one of a correspondence between single network slice selection assistance information (S-NSSAI) and a network slice instance identifier (NSI ID) or a correspondence between the S-NSSAI and a network slice subnet instance identifier (NSSI ID), and the configuration parameter instructs the NSSF to select, based on the configuration parameter, at least one of a network slice instance (NSI) or a network slice subnet instance (NSSI) for S-NSSAI provided by user equipment.

18 Claims, 5 Drawing Sheets

(51) Int. Cl.
*G06F 9/455* (2018.01)
*H04W 8/08* (2009.01)
*H04W 48/16* (2009.01)
*H04W 84/04* (2009.01)

(52) U.S. Cl.
CPC ............ *H04W 48/16* (2013.01); *H04W 76/11* (2018.02); *G06F 2009/45595* (2013.01); *H04W 84/042* (2013.01)

(58) Field of Classification Search
CPC ........... H04W 84/042; H04W 41/0803; H04W 72/0493; H04W 72/08; H04W 72/06; H04W 68/005; H04W 76/27; H04W 28/0247; H04W 28/0846; H04W 28/12; H04W 72/0406; H04W 72/044; H04W 72/0446; H04W 72/0486; H04W 76/00; H04W 88/00; H04W 88/14; H04W 88/02; H04W 88/18; H04W 88/08; H04W 72/04; H04W 72/048; H04W 48/00; H04W 48/20; H04W 72/00; H04W 72/12; H04W 8/22; H04W 8/24; H04W 4/02; H04W 4/021; H04W 4/029; G06F 9/455; G06F 2009/45595; G06F 9/45558; H04L 41/0803

See application file for complete search history.

(56) References Cited

U.S. PATENT DOCUMENTS

2017/0303259 A1* 10/2017 Lee et al. ............ H04W 72/048
2018/0206152 A1 7/2018 Zhang et al.
2019/0223093 A1* 7/2019 Watfa et al. .......... H04W 48/18
2019/0357129 A1* 11/2019 Park et al. ............ H04W 48/18
2020/0015158 A1* 1/2020 So
2020/0120589 A1* 4/2020 Velve et al. .......... H04W 48/18
2020/0145833 A1* 5/2020 Thakolsri et al. .... H04W 16/02

OTHER PUBLICATIONS

ZTE et al., "23.501 P-CR: Network Slicing Update for supporting standalone NSSF plus miscellaneous changes to the existing text.",SA WG2 Meeting #121, S2-173362, May 15-19, 2017, 10 pages.

ZTE et al., "23.501 P-CR: Network Slicing Update for supporting standalone NSSF", SA WG2 Meeting #122, S2-174249, San Jose, Del Cabo, Jun. 25-30, 2017, 14 pages.

Ericsson, "NSSF and Slice selection during the Registration procedures",SA WG2 Meeting #122, S2-175216, San Jose, Del Cabo, Jun. 26-30, 2017, 12 pages.

Office Action issued in Chinese Application No. 201710687802.8 dated Mar. 2, 2020, 14 pages (With English Translation).

Extended European Search Report issued in European Application No. 1844463.2 dated May 28, 2020, 12 pages.

PCT International Search Report and Written Opinion in International Application No. PCT/CN2018/095,133, dated Sep. 25, 2020, 15 pages (With English Translation).

3GPP TR 23.799 V1.2.1 (Nov. 2016), "3rd Generation Partnership Project, Technical Specification Group Services and System Aspects, Study on Architecture for Next Generation System(Release 14)," Nov. 2016, 526 pages.

3GPP TS 23.501 V1.2.0 (Jul. 2017), "3rd Generation Partnership Project, Technical Specification Group Services and System Aspects, System Architecture for the 5G System, Stage 2 (Release 15)," Jul. 2017, 166 pages.

* cited by examiner

NETWORK MANAGEMENT METHOD AND SYSTEM

CROSS-REFERENCE TO RELATED APPLICATIONS

This application is a continuation of International Application No. PCT/CN2018/095133, filed on Jul. 10, 2018, which claims priority to Chinese Patent Application No. 201710687802.8, filed on Aug. 11, 2017. The disclosures of the aforementioned applications are hereby incorporated by reference in their entireties.

TECHNICAL FIELD

The present invention relates to the communications field, and in particular, to a network management method, a network slice selection function, a network slice management and orchestration, and a network system.

BACKGROUND

In a next generation mobile network, a network is abstracted as many "network slices", one network slice satisfies a type of communications service requirements or a communications service requirement, and an entire network system includes a large quantity of network slices satisfying different service capabilities. A network slice instance is a really running logical network, and a complete network slice instance can provide a complete end-to-end network service. The network slice instance may include a network slice subnet instance and/or a network function.

When user equipment (UE) registers with a telecommunications network, a network slice selection function (NSSF) is introduced into the network to select a network slice instance for the UE.

However, in the prior art, a solution in which the NSSF selects a unique network slice instance (NSI) and/or network slice subnet instance (NSSI) for the UE based on single network slice selection assistance information (S-NSSAI) is not provided, and consequently, access of the UE to the telecommunications network is affected.

SUMMARY

Embodiments of the present invention provide a network management method, a network slice selection function, a network slice management and orchestration, and a network system, to enable an NSSF to have a function of selecting a network slice instance and/or network slice subnet instance for S-NSSAI of UE.

According to a first aspect, an embodiment of the present invention provides a network management method. The method includes: obtaining, by an NSSF, a configuration parameter sent by an NSMAO, where the configuration parameter includes a correspondence, the correspondence is a correspondence between S-NSSAI and an NSI ID and/or a correspondence between the S-NSSAI and an NSSI ID, and the configuration parameter is used to instruct the NSSF to select, based on the configuration parameter, an NSI and/or NSSI for S-NSSAI provided by user equipment. To be specific, after obtaining the configuration parameter, the NSSF may match the S-NSSAI provided by the user equipment and the S-NSSAI in the correspondence, to determine an NSI ID and/or NSSI ID, so that the NSSF selects the NSI and/or NSSI based on the NSI ID and/or NSSI ID.

In this way, after the NSSF obtains the configuration parameter, the NSSF may configure the configuration parameter, to perform a corresponding operation by using the configuration parameter, thereby implementing more functions. For example, when the NSSF obtains S-NSSAI sent by UE, the NSSF may query, based on the S-NSSAI sent by the UE, the correspondence in the configured configuration parameter, to determine a unique NSI ID and/or NSSI ID in the correspondence. Then, the NSSF may select a unique NSI and/or NSSI for the UE based on the determined NSI ID and/or NSSI ID. In this way, by obtaining the configuration parameter sent by the NSMAO, the NSSF has a function of selecting a unique network slice instance and/or network slice subnet instance for UE.

With reference to the first aspect of the embodiments of the present invention, in a first implementation of the first aspect of the embodiments of the present invention, the S-NSSAI according to the first aspect, the NSMAO, and the NSSF are located in a VPLMN, and an NSI identified by the NSI ID and/or an NSSI identified by the NSSI ID are/is located in the VPLMN. The correspondence further includes hS-NSSAI, and the hS-NSSAI is S-NSSAI in an HPLMN. To be specific, the correspondence is a correspondence between hS-NSSAI, S-NSSAI, and an NSI ID and/or a correspondence between hS-NSSAI, S-NSSAI, and an NSSI ID.

In this way, the method in this implementation is applicable to a roaming scenario. When UE accesses a roaming network, the NSSF may determine an NSI ID and/or NSSI ID for the UE based on the configured configuration parameter, to select a unique NSI and/or NSSI for the UE.

With reference to the first aspect or the first implementation of the first aspect of the embodiments of the present invention, in a second implementation of the first aspect of the embodiments of the present invention, the configuration parameter further includes assistance information, the assistance information corresponds to the correspondence, and the assistance information is used to instruct the NSSF to select the correspondence.

To be specific, after the NSSF obtains the configuration parameter including the assistance information and the correspondence, the NSSF may select the correspondence based on the assistance information. Therefore, when the NSSF configures a plurality of correspondences that have same S-NSSAI, if S-NSSAI provided by UE is the same as the configured S-NSSAI, the NSSF may determine an NSI ID and/or NSSI ID by using the assistance information.

With reference to the second implementation of the first aspect of the embodiments of the present invention, in a third implementation of the first aspect of the embodiments of the present invention, the assistance information includes one or any combination of access technology information, location information, priority information, and access and mobility management function AMF information, where the access technology information is used to indicate an access technology used when a user access device accesses a network slice instance and/or network slice subnet instance; the location information includes a tracking area identity TAI and/or a routing area identity RAI; the priority information is used to indicate a priority of the correspondence; and the AMF information includes one or any combination of an AMF set identifier, an AMF identifier, and an AMF selection rule.

With reference to the first aspect of the embodiments of the present invention, in a fourth implementation of the first aspect of the embodiments of the present invention, after the obtaining, by an NSSF, a configuration parameter sent by an NSMAO, the method in this implementation further includes: configuring, by the NSSF, the configuration parameter to obtain a configuration result, where the configuration result is used to indicate a completion status of configuring the configuration parameter by the NSSF; and sending, by the NSSF, the configuration result to the NSMAO. Therefore, the NAMAO can learn of a status of configuring the configuration parameter by the NSSF, to perform different operations based on different configuration statuses, thereby improving reliability of this implementation.

With reference to the first aspect of the embodiments of the present invention, in a fifth implementation of the first aspect of the embodiments of the present invention, the NSMAO is one or any combination of a network manager NM, a domain manager DM, an element manager EM, a network slice management function NSMF, a network slice subnet management function NSSMF, a communications service management function CSMF, a network function virtualization orchestration NFVO, and a virtualized network function manager VNFM.

According to a second aspect, an embodiment of the present invention provides a network management method. The method includes:

obtaining, by an NSMAO, a configuration parameter, where the configuration parameter includes a correspondence, and the correspondence is a correspondence between S-NSSAI and an NSI ID and/or a correspondence between the S-NSSAI and an NSSI ID; and sending, by the NSMAO, the configuration parameter to an NSSF, so that the NSSF performs a corresponding operation based on the configuration parameter. For example, the configuration parameter is used to instruct the NSSF to select, based on the configuration parameter, an NSI and/or NSSI for S-NSSAI provided by user equipment, or the configuration parameter is configured by the NSSF. Therefore, after the NSSF obtains the configuration parameter, the NSSF may configure the configuration parameter, to perform a corresponding operation by using the configuration parameter, thereby implementing more functions. For example, when the NSSF obtains S-NSSAI sent by UE, the NSSF may query, based on the S-NSSAI sent by the UE, the correspondence in the configured configuration parameter, to determine a unique NSI ID and/or NSSI ID in the correspondence; and then the NSSF may select a unique NSI and/or NSSI based on the determined NSI ID and/or NSSI ID.

In this way, the NSMAO sends the configuration parameter to the NSSF, so that the NSSF has more functions, and in particular, the NSSF can select a unique NSI and/or NSSI by using the configuration parameter.

With reference to the second aspect of the embodiments of the present invention, in a first implementation of the second aspect of the embodiments of the present invention, the S-NSSAI according to the second aspect, the NSMAO, and the NSSF are located in a VPLMN, and an NSI identified by the NSI ID and/or an NSSI identified by the NSSI ID are/is located in the VPLMN. The correspondence further includes hS-NSSAI, and the hS-NSSAI is S-NSSAI in an HPLMN. To be specific, the correspondence is a correspondence between an NSI ID, S-NSSAI, and hS-NSSAI and/or a correspondence between an NSSI ID, S-NSSAI, and hS-NSSAI.

In this way, the method in this implementation is applicable to a roaming scenario. The NSSF may select, by using the configuration parameter, a unique NSI and/or NSSI for UE that accesses a roaming network.

With reference to the second aspect or the first implementation of the second aspect of the embodiments of the present invention, in a second implementation of the second aspect of the embodiments of the present invention, the configuration parameter further includes assistance information, the assistance information corresponds to the correspondence, and the assistance information is used to instruct the NSSF to select the correspondence.

In this way, the NSSF that obtains the configuration parameter may select the correspondence based on the assistance information. Therefore, when the NSSF configures a plurality of correspondences that have same S-NSSAI, if S-NSSAI provided by UE is the same as the configured S-NSSAI, the NSSF may determine an NSI ID and/or NSSI ID by using the assistance information.

With reference to the second implementation of the second aspect of the embodiments of the present invention, in a third implementation of the second aspect of the embodiments of the present invention, the assistance information includes one or any combination of access technology information, location information, priority information, and access and mobility management function AMF information, where the access technology information is used to indicate an access technology used when a user access device accesses a network slice instance and/or network slice subnet instance; the location information includes a tracking area identity TAI and/or a routing area identity RAI; the priority information is used to indicate a priority of the correspondence; and the AMF information includes one or any combination of an AMF set identifier, an AMF identifier, and an AMF selection rule.

With reference to the second aspect of the embodiments of the present invention, in a fourth implementation of the second aspect of the embodiments of the present invention, after the sending, by the NSMAO, the configuration parameter to an NSSF, the method in this implementation further includes:

obtaining, by the NSMAO, a configuration result sent by the NSSF, where the configuration result is used to indicate a completion status of configuring the configuration parameter by the NSSF. Therefore, the NAMAO can learn of a status of configuring the configuration parameter by the NSSF, to perform different operations based on different configuration statuses, thereby improving reliability of this implementation.

With reference to the second aspect of the embodiments of the present invention, in a fifth implementation of the second aspect of the embodiments of the present invention, the NSMAO is one or any combination of a network manager NM, a domain manager DM, an element manager EM, a network slice management function NSMF, a network slice subnet management function NSSMF, a communications service management function CSMF, a network function virtualization orchestration NFVO, and a virtualized network function manager VNFM.

According to a third aspect, an embodiment of this application provides a network slice selection function. The network slice selection function has a function of the network slice selection function in the foregoing method. The function may be implemented by using hardware, or may be implemented by hardware executing corresponding software. The hardware or the software includes one or more modules corresponding to the foregoing function.

In a possible implementation, the network slice selection function includes:

an obtaining unit, configured to obtain a configuration parameter sent by a network slice management and orchestration NSMAO, where the configuration parameter includes a correspondence, the correspondence is a correspondence between single network slice selection assistance information S-NSSAI and a network slice instance identifier NSI ID and/or a correspondence between the S-NSSAI and a network slice subnet instance identifier NSSI ID, and the configuration parameter is used to instruct the NSSF to select, based on the configuration parameter, an NSI and/or NSSI for S-NSSAI provided by user equipment.

Optionally, the network slice selection function further includes:

a configuration unit, configured to configure the configuration parameter to obtain a configuration result, where the configuration result is used to indicate a completion status of configuring the configuration parameter by the NSSF; and a sending unit, configured to send the configuration result to the NSMAO.

In another possible implementation, the network slice selection function includes:

a transceiver, where the transceiver performs the following operation: obtaining a configuration parameter sent by a network slice management and orchestration NSMAO, where the configuration parameter includes a correspondence, the correspondence is a correspondence between single network slice selection assistance information S-NSSAI and a network slice instance identifier NSI ID and/or a correspondence between the S-NSSAI and a network slice subnet instance identifier NSSI ID, and the configuration parameter is used to instruct the NSSF to select, based on the configuration parameter, an NSI and/or NSSI for S-NSSAI provided by user equipment.

Optionally, the network slice selection function further includes:

a processor, where the processor performs the following operation: configuring the configuration parameter to obtain a configuration result, where the configuration result is used to indicate a completion status of configuring the configuration parameter by the NSSF; and the transceiver performs the following operation: sending the configuration result to the NSMAO.

According to a fourth aspect, an embodiment of this application provides a network slice management and orchestration NSMAO. The network slice management and orchestration NSMAO has a function of the network slice management and orchestration NSMAO in the foregoing method. The function may be implemented by using hardware, or may be implemented by hardware executing corresponding software. The hardware or software includes one or more modules corresponding to the foregoing function.

In a possible implementation, the network slice management and orchestration includes:

an obtaining unit, configured to obtain a configuration parameter, where the configuration parameter includes a correspondence, and the correspondence is a correspondence between S-NSSAI and an NSI ID and/or a correspondence between the S-NSSAI and an NSSI ID; and a sending unit, configured to send the configuration parameter to an NSSF.

Optionally, the obtaining unit is further configured to obtain a configuration result sent by the NSSF, where the configuration result is used to indicate a completion status of configuring the configuration parameter by the NSSF.

In another possible implementation, the network slice management and orchestration includes:

a transceiver, where the transceiver performs the following operation: obtaining a configuration parameter, where the configuration parameter includes a correspondence, and the correspondence is a correspondence between S-NSSAI and an NSI ID and/or a correspondence between the S-NSSAI and an NSSI ID; and the transceiver further performs the following operation: sending the configuration parameter to the NSSF.

Optionally, the transceiver further performs the following operation: obtaining a configuration result sent by the NSSF, where the configuration result is used to indicate a completion status of configuring the configuration parameter by the NSSF.

According to a fifth aspect, an embodiment of the present invention further provides a network system. The network system includes a network slice selection function and a network slice management and orchestration, where the network slice selection function is the network slice selection function according to the third aspect; and the network slice management and orchestration is the network slice management and orchestration according to the fourth aspect.

Another aspect of this application provides a computer-readable storage medium. The computer-readable storage medium stores an instruction. When the instruction is run on a computer, the computer is enabled to perform the method according to the foregoing aspects.

Another aspect of this application provides a computer program product including an instruction. When the computer program product is run on a computer, the computer is enabled to perform the method according to the foregoing aspects.

It can be learned from the foregoing technical solutions that the embodiments of the present invention have the following advantages:

The NSSF obtains the configuration parameter sent by the NSMAO, where the configuration parameter includes the correspondence, the correspondence is a correspondence between single network slice selection assistance information S-NSSAI and a network slice instance identifier NSI ID and/or a correspondence between the S-NSSAI and a network slice subnet instance identifier NSSI ID, and the configuration parameter is used to instruct the NSSF to select, based on the configuration parameter, an NSI and/or NSSI for S-NSSAI provided by user equipment. Therefore, the NSSF may perform a corresponding operation by using the configuration parameter, to implement more functions. For example, after configuring the configuration parameter, when the NSSF obtains S-NSSAI sent by UE, the NSSF may query, based on the S-NSSAI sent by the UE, the correspondence in the configuration parameter. Because the correspondence is a correspondence between S-NSSAI and an NSI ID and/or a correspondence between the S-NSSAI and an NSSI ID, if the S-NSSAI sent by the UE matches the S-NSSAI in the correspondence, the NSSF may determine a unique NSI ID and/or NSSI ID in the correspondence, and then may select a unique NSI and/or NSSI for the UE based on the determined NSI ID and/or NSSI ID. In this way, by obtaining the configuration parameter sent by the NSMAO, the NSSF has a function of selecting a network slice instance and/or network slice subnet instance for S-NSSAI of UE.

DESCRIPTION OF EMBODIMENTS

Figure 1:
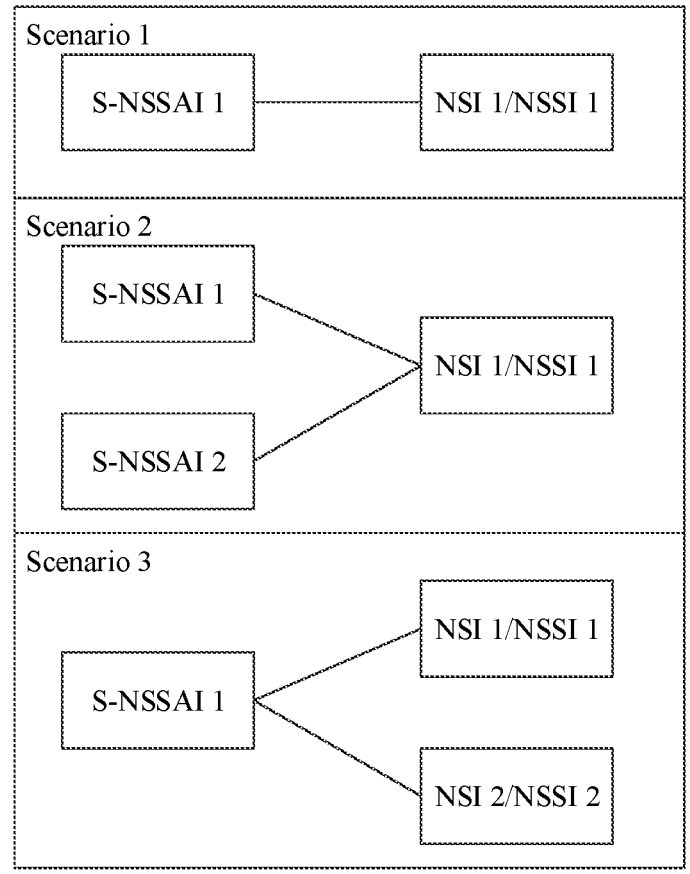
FIG. 1 is a schematic diagram of a scenario between S-NSSAI and an NSI ID/NSSI ID according to an embodiment of the present invention.

Embodiments of the present invention provide a network management method, a network slice selection function, a network slice management and orchestration, and a network system, to enable an NSSF to have a function of selecting an NSI and/or NSSI for S-NSSAI of UE.

With rapid development of mobile communications, digital transformation is almost involved in all conventional industries. However, a conventional cellular network architecture can provide only a unified network service, and it is difficult to satisfy communication requirements with great differences, such as communication requirements with a functional difference and a performance difference, that are brought by a digital transformation wave.

In a next generation mobile network, a network is abstracted as "network slices", and one network slice satisfies a type of connection communication service requirements or a connection communication service requirement in one case.

In a 5th generation (5G) system, the entire 5G system includes a large quantity of network slices satisfying different communications service capabilities. On a unified network platform, supporting communications services having different functions and quality of service (QoS) by using a dynamic and secure network slice is one of basic capabilities of the 5G network.

A network slice instance is created by a network management system. One network management system may create and manage a plurality of network slice instances at the same time, for example, modify and terminate the plurality of network slice instances, and perform performance monitoring and fault management on the plurality of network slice instances in running processes of the network slice instances. A complete network slice instance can provide a complete end-to-end network service, and the network slice instance may include a network slice subnet instance and/or a network function. One network slice instance is identified by using one network slice instance identifier (Network Slice Instance ID, NSI ID). Correspondingly, one network slice subnet instance is identified by using one network slice subnet instance identifier (Network Slice Subnet Instance ID, NSSI ID). For example, the NSI ID and the NSSI ID may be character strings, or may be names that can be understood by human beings.

When user equipment registers with a telecommunications network, the network needs to select a unique network slice instance/network slice subnet instance for the UE.

Therefore, according to the 3GPP TS 23.501 v1.2.0 protocol specification, a network slice selection function (NSSF) is introduced into a system on a network side to select a network slice instance for UE. A main function of the NSSF is selecting an NSI/NSSI for serving UE. When UE is registered with a network, the UE establishes a connection to an access and mobility management function (AMF), and provides S-NSSAI to the AMF. The AMF is referred to as an initial AMF. Based on a preconfigured criterion (for example, a criterion such as a whitelist or a blacklist), the initial AMF checks whether the initial AMF can serve the UE. If the initial AMF cannot serve the UE, the initial AMF initiates a query to an NSSF, to find an AMF (referred to as a target AMF) that can serve the UE. When the initial AMF initiates the query to the NSSF, the initial AMF needs to provide the NSSF with the S-NSSAI provided by the UE. The NSSF determines, based on the S-NSSAI provided by the initial AMF, namely, the S-NSSAI provided by the UE, an NSI/NSSI that serves the UE, and determines the target AMF that serves the UE. Three scenarios between S-NSSAI and an NSI ID/NSSI ID shown in FIG. 1 may exist:

Scenario 1: There is a one-to-one correspondence between S-NSSAI and an NSI/NSSI.

Scenario 2: A plurality of pieces of S-NSSAI correspond to one NSI/NSSI.

Scenario 3: One piece of S-NSSAI corresponds to a plurality of NSIs/NSSIs.

It can be learned from the scenarios shown in FIG. 1 that, it is likely that the NSSF cannot select a unique NSI/NSSI by using only information about the S-NSSAI of the UE. In the prior art, no solution is provided for enabling the NSSF to select the unique NSI/NSSI based on the S-NSSAI of the UE.

Therefore, the embodiments of the present invention provide a network management method, a network slice selection function, a network slice management and orchestration, and a network system, to resolve a problem of selecting a unique NSI and/or NSSI based on S-NSSAI.

To better understand the solutions in the embodiments of the present invention, some key terms used in the embodiments of the present invention are described herein.

Network slice: Network slices refer to different logical networks that are customized based on different service requirements on a physical or virtual network infrastructure. The network slice may be a complete end-to-end network that includes a terminal, an access network, a transport network, a core network, and an application server, can provide a complete telecommunications service, and has a network capability. Alternatively, the network slice may be any combination of the terminal, the access network, the transport network, the core network, and the application server.

Network slice instance (NSI): The NSI is a really running logical network that can satisfy a network feature or service requirement. One network slice instance may provide one or more services. When a plurality of network slice instances coexist, the network slice instances may share some network resources and network functions. A complete network slice instance can provide a complete end-to-end network service, and the network slice instance may include a network slice subnet instance and/or a network function. The network function may include a physical network function and/or a virtual network function. A physical network function and/or a virtual network function are/is collectively referred to as a network function in the embodiments of this application.

Network slice subnet instance (NSSI): The network slice subnet instance may not need to provide a complete end-to-end network service, and the network slice subnet instance may be a set including network functions of a same vendor in a network slice instance, or may be a set of network functions divided by domain, for example, a core-network network slice subnet instance, an access-network network slice subnet instance, or a set formed in another manner such as based on deployment locations. A network slice subnet instance may be shared by a plurality of network slice instances.

Network function (NF): The NF is a processing function in a network, and defines functional behavior and a functional interface. The network function may be implemented by using dedicated hardware, or may be implemented by running software on dedicated hardware, or may be implemented in a form of a virtual function on a universal hardware platform. Therefore, from a perspective of implementation, network functions may be classified into a physical network function and a virtual network function. From a perspective of use, network functions may be classified into a dedicated network function and a shared network function. Specifically, a plurality of (sub)network slice instances may independently use different network functions, and these network functions are referred to as dedicated network functions. Alternatively, a plurality of (sub)network slice instances may share a same network function, and this network function is referred to as a shared network function.

A relationship between a network slice instance, a network slice subnet instance, and a network function may be as follows:

One network slice instance may include several network slice subnet instances, and each network slice subnet instance includes several network functions and/or several network slice subnet instances. One network slice instance may include several network slice subnet instances and network functions that are not grouped into network slice subnet instances. One network slice instance may alternatively include only several network functions. A network function is a most basic functional unit constituting a network slice instance, and one network slice subnet instance includes one or more network functions.

Single network slice selection assistance information (S-NSSAI): The S-NSSAI is used to identify a network slice. The S-NSSAI includes two parts: (1) a slice/service type (SST), used to point to expected network slice behavior characterized as a feature and a service; and (2) a slice differentiator (SD), used to supplement optional information of the SST, so that a network slice instance/network slice subnet instance that completely complies with the SST can be selected from a plurality of potential network slice instances/network slice subnet instances. When UE provides one piece of S-NSSAI, the UE is served by one network slice instance/network slice subnet instance. In addition, one piece of NSSAI includes a plurality of pieces of S-NSSAI. One piece of NSSAI includes a maximum of eight pieces of S-NSSAI. The UE may provide a plurality of pieces of S-NSSAI at the same time. Correspondingly, when the UE provides a plurality of pieces of S-NSSAI, the UE may be served by a plurality of NSIs/NSSIs.

Figure 2:
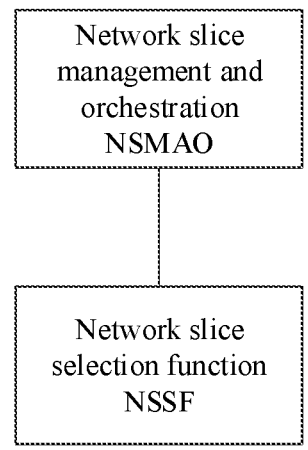
FIG. 2 is a diagram of a network architecture in a network management method according to another embodiment of the present invention.

FIG. 2 is a diagram of a network architecture in a network management method according to an embodiment of the present invention. As shown in FIG. 2, the network architecture includes a network slice management and orchestration (NSMAO) and an NSSF, and the NSMAO and the NSSF may exchange information.

The NSMAO is mainly responsible for managing a lifecycle, performance, a fault, configuration, and the like of an NSI/NSSI, and orchestrating composition of the NSI/NSSI. The lifecycle management, performance management, fault management, configuration management, orchestration, and the like on the NSI/NSSI and components (for example, a slice subnet instance and a network function) of the NSI/NSSI are collectively referred to as management.

Specifically, the NSMAO may be a network manager (NM), a domain manager (DM), an element manager (EM), a network slice management function (NSMF), a network slice subnet management function (Network Slice Subnet Management Function), a communications service management function (CSMF), a network function virtualization orchestration (NFVO), a virtualized network function manager (VNFM); or any combination of the foregoing modules, such as a combination of an NSMF and an EM, a combination of an NSSMF and an EM, or a combination of an NSMF and an NSSMF.

The NSSF is mainly responsible for selecting a network slice instance for UE based on S-NSSAI. When the NSSF obtains the S-NSSAI sent by the UE, the NSSF selects, based on the S-NSSAI, a network slice instance and/or network slice subnet instance that serve/serves the UE, and determines an AMF set and/or an AMF that serve/serves the UE.

In the network management method provided in the embodiments of the present invention, the NSMAO configures information related to NSI/NSSI selection for the NSSF, to be specific, a configuration parameter delivered by the NSMAO to the NSSF includes the information related to the NSI/NSSI selection.

For the network management method, the NSSF, the NSMAO, and the network system provided in the embodiments of the present invention, refer to detailed descriptions below.

Figure 3:
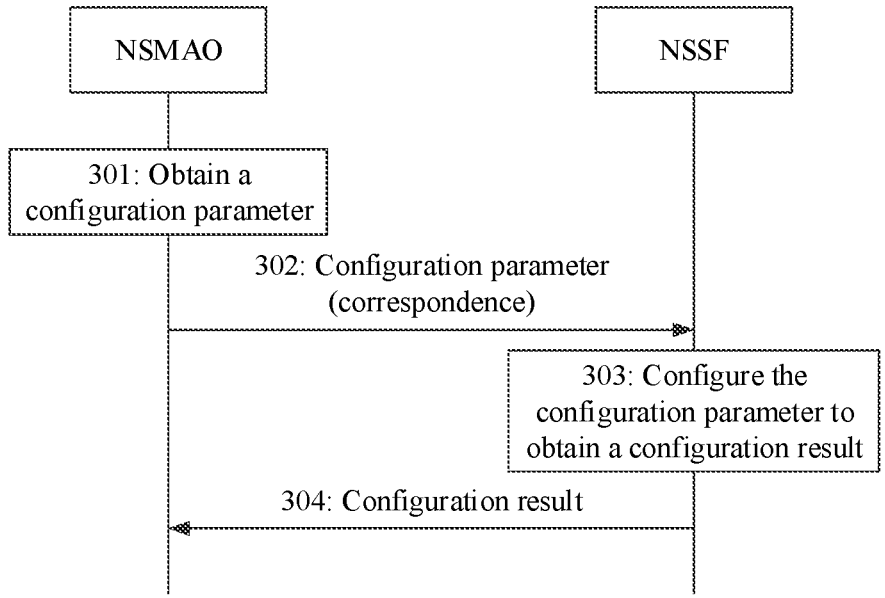
FIG. 3 is a method flowchart of a network management method according to another embodiment of the present invention.

FIG. 3 is a method flowchart of a network management method according to an embodiment of the present invention. The network management method is applicable to the network architecture shown in FIG. 2.

Referring to the foregoing descriptions of the embodiments and the detailed descriptions of the related technical terms, and referring to FIG. 3, the network management method in this embodiment of the present invention includes the following steps.

Step 301: The NSMAO obtains a configuration parameter.

The configuration parameter includes a correspondence, and the correspondence is a correspondence between network slice-related identifiers. Specifically, the correspondence is a correspondence between S-NSSAI and an NSI ID and/or a correspondence between the S-NSSAI and an NSSI ID.

Specifically, the NSMAO obtains the configuration parameter in a plurality of specific manners, including but not limited to:

(1) A network administrator inputs the correspondence to the NSMAO, where the correspondence is a correspondence between S-NSSAI and an NSI ID and/or a correspondence between the S-NSSAI and an NSSI ID, so that the NSMAO obtains a configuration parameter that is the correspondence.

(2) The NSMAO obtains the configuration parameter from another NSMAO. For example, when the NSMAO is an EM, the EM may obtain the configuration parameter from an NSMF or an NSSMF.

(3) The NSMAO generates the configuration parameter. For example, the NSMAO generates the configuration parameter based on a preconfigured related policy.

There are a plurality of specific parameters about the correspondence, for example, as shown in the following descriptions:

In some embodiments of the present invention, the correspondence is a correspondence between an NSI ID and S-NSSAI.

In still some embodiments of the present invention, the correspondence is a correspondence between an NSSI ID and S-NSSAI.

In still some embodiments of the present invention, the correspondence is a correspondence between an NSSI ID, an NSI ID, and S-NSSAI.

The correspondence may have a plurality of specific forms, which include but are not limited to:

(1) The correspondence may be in a form of a mapping table, to be specific, the mapping table includes an NSI ID or an NSSI ID, and further includes S-NSSAI.

As described in the embodiment shown in FIG. 2, the NSMAO is one or any combination of a network manager NM, a domain manager DM, an element manager EM, a network slice management function NSMF, a network slice subnet management function NSSMF, a communications service management function CSMF, a network function virtualization orchestration NFVO, and a virtualized network function manager VNFM.

Step 302: The NSMAO sends the configuration parameter to the NSSF.

After the NSMAO obtains the configuration parameter, the NSMAO performs corresponding configuration on the NSSF, and the NSMAO sends the configuration parameter to the NSSF. The NSSF obtains the configuration parameter sent by the NSMAO, to be specific, obtains the correspondence shown in step 301. The configuration parameter is used to instruct the NSSF to select, based on the configuration parameter, an NSI and/or NSSI for S-NSSAI provided by user equipment.

For example, the NSMAO sends a management request for an NSI/NSSI to the NSSF, the management request includes at least one group of configuration parameters, and the configuration parameters/configuration parameter are/is a correspondence between S-NSSAI and an NSI ID and/or a correspondence between the S-NSSAI and an NSSI ID. The management request sent by the NSMAO to the NSSF includes the correspondence between an NSI ID/NSSI ID and S-NSSAI, so that a correspondence between each NSI ID/NSSI ID and S-NSSAI is determined. In this way, the network management method in this embodiment of the present invention is particularly applicable to a scenario in which S-NSSAI and an NSI/NSSI are in a one-to-one correspondence.

It may be understood that, in some embodiments of the present invention, if a plurality of correspondences need to be configured, the NSMAO may send a configuration parameter to the NSSF, where the configuration parameter is a correspondence, and then the NSMAO performs the sending operation for a plurality of times, to send the plurality of correspondences. For example, the NSMAO may separately send a plurality of management requests to the NSSF, and each management request includes a group of configuration parameters. Alternatively, the NAMAO may send a management request to the NSSF, and the management request includes a plurality of groups of different configuration parameters.

After the NSSF obtains the configuration parameter, the configuration parameter is used to instruct the NSSF to select, based on the configuration parameter, an NSI and/or NSSI for S-NSSAI provided by user equipment. For example, the NSSF obtains S-NSSAI provided by UE, and then matches the S-NSSAI in the correspondence in the configuration parameter and the S-NSSAI provided by the UE, and if the matching succeeds, the NSSF may determine an NSI ID and/or NSSI ID in the correspondence, so that the NSSF obtains an NSI and/or NSSI through selection based on the determined NSI ID/NSSI ID.

Step 303: The NSSF configures the configuration parameter to obtain a configuration result.

The configuration result is used to indicate a completion status of configuring the configuration parameter by the NSSF. The configuration is configuring a related parameter of the NSSF, to enable the NSSF to provide a service.

After the NSSF obtains the configuration parameter sent by the NSMAO, the NSSF configures the configuration parameter, to prepare for subsequent use of the configuration parameter.

The correspondence includes a correspondence between S-NSSAI and an NSI ID and/or a correspondence between the S-NSSAI and an NSSI ID. Therefore, specifically, the NSSF configures these parameters.

Specific configuration manner: For example, there are one or more mapping tables on the NSSF, and after receiving the management request from the NSMAO, the NSSF writes the correspondence in the management request to the mapping table. Alternatively, the NSSF has a database, and the NSSF stores the correspondence in the database.

After configuring the configuration parameter, the NSSF may obtain the configuration result. The configuration result is used to indicate a completion status of configuring the configuration parameter by the NSSF.

Specifically, the configuration result includes one of configuration success information, configuration failure information, and information indicating success of partial configuration.

For example, when the NSSF successfully configures the obtained configuration parameter, configuration success information is generated, and may be specifically an identifier "1". Alternatively, when the NSSF fails to configure the configuration parameter, for example, the NSSF fails to store the correspondence in the mapping table, configuration failure information is generated, and may be specifically an identifier "0".

It may be understood that, in some embodiments of the present invention, the NSSF may configure the configuration parameter, and the NSSF may not obtain the configuration result. To be specific, in some embodiments, step 303 is as follows: The NSSF configures the configuration parameter.

After the NSSF configures the configuration parameter, a manner of using the configuration parameter may be as follows: When UE accesses a network, the UE provides S-NSSAI to the NSSF. Based on execution of the foregoing steps in this embodiment of the present invention, to be specific, that the NSMAO configures the correspondence between S-NSSAI and an NSI ID and/or the correspondence between the S-NSSAI and an NSSI ID for the NSSF, and stores the correspondence in the NSSF, the NSSF queries the stored correspondence by using the S-NSSAI provided by the UE. When the S-NSSAI in the correspondence matches the S-NSSAI provided by the UE, the NSSF may determine an NSI ID and/or NSSI ID in the correspondence. Because a network slice instance is identified by using a unique NSI ID, and a network slice subnet instance is identified by using a unique NSSI ID, the NSSF can select a unique NSI for the UE based on the determined NSI ID; and the NSSF can select a unique NSSI for the UE based on the determined NSSI ID.

Step 304: The NSSF sends the configuration result to the NSMAO.

After the NSSF obtains the configuration result, the NSSF may send the configuration result to the NSMAO, so that the NSMAO obtains the configuration result.

For example, after managing the configuration parameter based on the management request including the configuration parameter, the NSSF obtains a configuration result, and then the NSSF sends a management response to the NSMAO to feed back the configuration result.

The configuration result is used to indicate a completion status of configuring the configuration parameter by the NSSF. Therefore, the NAMAO may perform a corresponding operation based on the configuration result. A specific corresponding operation is not specifically limited in this embodiment of the present invention.

For example, when the configuration result indicates that the configuration parameter has been configured on the NSSF, to be specific, the configuration result is configuration success information, the procedure in this embodiment of the present invention ends. If the configuration result indicates that the configuration parameter is not configured on the NSSF, to be specific, the configuration result is configuration failure information, the NAMAO may continue to resend the configuration parameter to the NSSF, or the NAMAO initiates an operation such as a configuration failure cause request to the NSSF.

It may be understood that, in some embodiments of the present invention, step 304 may not be included, or step 303 and step 304 may not be included.

In conclusion, the NSSF obtains the configuration parameter sent by the NSMAO, the configuration parameter includes the correspondence, and the correspondence is a correspondence between S-NSSAI and an NSI ID and/or a correspondence between the S-NSSAI and an NSSI ID. The configuration parameter is used to instruct the NSSF to select, based on the configuration parameter, an NSI and/or NSSI for S-NSSAI provided by user equipment. The NSSF may perform a corresponding operation by using the configuration parameter, to implement more functions. For example, when the NSSF obtains S-NSSAI sent by UE, the NSSF may query, based on the S-NSSAI sent by the UE, the correspondence in the configured configuration parameter. If the S-NSSAI sent by the UE matches the S-NSSAI in the correspondence, the NSSF may determine a unique NSI ID and/or NSSI ID in the correspondence, and then may select a unique NSI and/or NSSI for the UE based on the determined NSI ID and/or NSSI ID. In this way, by obtaining the configuration parameter sent by the NSMAO, the NSSF has a function of selecting a network slice instance and/or network slice subnet instance for S-NSSAI of UE.

Figure 4:
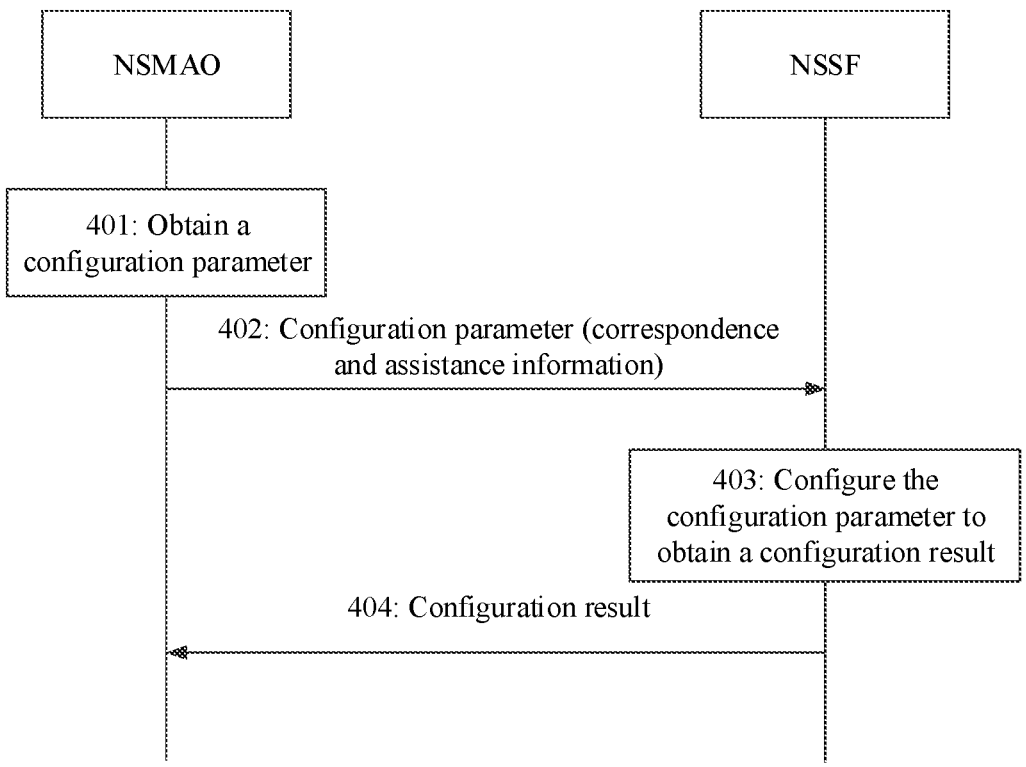
FIG. 4 is a method flowchart of a network management method according to another embodiment of the present invention.

FIG. 4 is a method flowchart of a network management method according to an embodiment of the present invention. The network management method is applicable to the network architecture shown in FIG. 2. The network management method shown in FIG. 4 may be a further improvement based on the network management method shown in FIG. 3. In this scenario, one piece of S-NSSAI may point to a plurality of NSIs/NSSIs, to be specific, there may be a plurality of network slice instances/network slice subnet instances for same S-NSSAI. Alternatively, a plurality of pieces of S-NSSAI may point to a same NSI/NSSI, to be specific, one network slice instance/network slice subnet instance may serve a plurality of pieces of S-NSSAI.

When one piece of S-NSSAI points to a plurality of NSIs/NSSIs, or a plurality of pieces of S-NSSAI point to one NSI/NSSI, there are correspondences between the same S-NSSAI and the plurality of NSI IDs/NSSI IDs or correspondences between the plurality of pieces of S-NSSAI and the same NSI ID/NSSI ID. In this case, assistance information needs to be introduced to instruct the NSSF to select a correspondence, to be specific, select a correspondence between S-NSSAI and an NSI ID/NSSI ID from the correspondences between the S-NSSAI and the plurality of NSI IDs/NSSI IDs or the correspondences between the plurality of pieces of S-NSSAI and the same NSI ID/NSSI ID.

Referring to the foregoing descriptions of the embodiments and the detailed descriptions of the technical terms, and referring to FIG. 4, the network management method in this embodiment of the present invention includes the following steps.

Step 401: The NSMAO obtains a configuration parameter.

The configuration parameter includes a correspondence, and the correspondence is a correspondence between network slice-related identifiers. Specifically, the correspondence is a correspondence between S-NSSAI and an NSI ID and/or a correspondence between the S-NSSAI and an NSSI ID.

The configuration parameter further includes assistance information, and the assistance information corresponds to the correspondence. To be specific, when the configuration parameter includes the assistance information and the correspondence, the assistance information in the configuration parameter correspond to the correspondence in the configuration parameter.

For the correspondence, refer to the detailed descriptions of the correspondence in step 301. In the embodiment shown in FIG. 4, the configuration parameter further includes the assistance information. The assistance information is used to instruct the NSSF to select the correspondence. After obtaining the configuration parameter, the NSSF may select the correspondence in the configuration parameter by using the assistance information in the configuration parameter.

The assistance information has a plurality of specific forms. For example, the assistance information includes one or any combination of access technology information, location information, priority information, and AMF information.

Details are as follows:

In some embodiments of the present invention, the assistance information is the access technology information, and the access technology information is used to indicate an access technology used when a user access device accesses a network slice instance and/or network slice subnet instance.

In some embodiments of the present invention, the assistance information may be the location information, and the location information includes a tracking area identity (TAI) and/or a routing area identity (RAI).

In some embodiments of the present invention, the assistance information may be the priority information. The priority information is used to indicate a priority of the correspondence. When there are a plurality of correspondences, and there is same S-NSSAI but different NSI IDs/NSSI IDs in the plurality of correspondences, a case in which a plurality of NSI IDs/NSSI IDs correspond to one piece of S-NSSAI occurs. In this case, a correspondence whose priority information indicates a high priority is preferentially used.

In some embodiments of the present invention, the assistance information may be the AMF information, and the AMF information includes one or any combination of an AMF set identifier (such as an AMF set ID), an AMF identifier (such as an AMF ID), and an AMF selection rule.

In some embodiments of the present invention, the assistance information is the AMF identifier and the AMF selection rule. To be specific, when the assistance information includes the AMF identifier, the assistance information may further include the AMF selection rule and the like.

Certainly, in still some embodiments of the present invention, the assistance information may be any combination of the access technology information, the location information, the priority information, and the AMF information.

Step 402: The NSMAO sends the configuration parameter to the NSSF.

After obtaining the configuration parameter, the NSMAO may send the configuration parameter to the NSSF. The NSSF obtains the configuration parameter sent by the NSMAO, to be specific, obtains the correspondence between an NSI ID/NSSI ID and S-NSSAI included in the configuration parameter, and the assistance information. The configuration parameter may be configured on the NSSF.

It may be understood that, because the correspondence is a correspondence between S-NSSAI and an NSI ID and/or a correspondence between the S-NSSAI and an NSSI ID, the assistance information in the configuration parameter may separately correspond to the two correspondences.

For example, in some embodiments of the present invention, the configuration parameter may be a correspondence between an NSI ID and S-NSSAI, and related assistance information.

Alternatively, the configuration parameter may be a correspondence between an NSSI ID and S-NSSAI, and related assistance information.

A specific implementation of step 402 may be, for example, that the NSMAO sends a management request for an NSI/NSSI to the NSSF, the management request includes at least one group of configuration parameters, and the configuration parameters/configuration parameter include/includes correspondences/a correspondence and assistance information. The correspondences/correspondence are/is a correspondence between S-NSSAI and an NSI ID and/or a correspondence between the S-NSSAI and an NSSI ID.

It may be understood that, in some embodiments of the present invention, if a plurality of correspondences need to be configured, the NSMAO may send a configuration parameter to the NNSF, where the configuration parameter includes a correspondence and assistance information corresponding to the correspondence, and then the NSMAO performs the sending operation for a plurality of times, to send the plurality of correspondences and assistance information corresponding to the plurality of correspondences. For example, the NSMAO may separately send a plurality of management requests to the NSSF, and each management request includes a group of configuration parameters. Alternatively, the NAMAO may send a management request to the NSSF, and the management request includes a plurality of groups of different configuration parameters.

Step 403: The NSSF configures the configuration parameter to obtain a configuration result.

The configuration result is used to indicate a completion status of configuring the configuration parameter by the NSSF.

After the NSSF obtains the configuration parameter sent by the NSMAO, the NSSF may configure the configuration parameter. For a specific configuration manner, refer to the specific descriptions of step 303. However, in this embodiment of the present invention, the NSSF configures the correspondence and the assistance information.

Specific configuration manner: For example, there are one or more mapping tables on the NSSF, and after receiving the management request from the NSMAO, the NSSF writes the configuration parameter in the management request to the mapping table, to be specific, writes the correspondence in the configuration parameter and the assistance information in the configuration parameter to the mapping table, to store the correspondence and the assistance information in a correspondence manner.

It may be understood that, in some embodiments of the present invention, the NSSF may configure the configuration parameter, and the NSSF may not obtain the configuration result. To be specific, in some embodiments, step 403 is as follows: The NSSF configures the configuration parameter.

After the NSSF configures the configuration parameter, a manner of using the configuration parameter may be shown in the detailed descriptions of step 303. In this embodiment of the present invention, because the configuration parameter further includes the assistance information, in this embodiment of the present invention, the NSSF may assist, by using the assistance information, in NSI/NSSI selection. This is particularly applicable when the NSSF stores a plurality of correspondences having same S-NSSAI, and a correspondence may be selected by using the assistance information, so that an NSI ID and/or NSSI ID are/is determined in the correspondence.

Specifically, the NSSF obtains a plurality of different correspondences by using step 402. If the plurality of different correspondences have same S-NSSAI and different NSI IDs or NSSI IDs, after the NSSF configures the plurality of correspondences, the S-NSSAI corresponds to the plurality of NSI IDs or NSSI IDs.

In this embodiment of the present invention, the configuration parameter configured by the NSSF further includes the assistance information, and the assistance information corresponds to the correspondence, so that even if one piece of S-NSSAI corresponds to a plurality of NSI IDs or NSSI IDs, the NSSF performs matching in the plurality of correspondences based on the S-NSSAI sent by the UE, to determine a plurality of NSI IDs or NSSI IDs, and the NSSF matches the assistance information of the UE and the assistance information corresponding to the plurality of correspondences, so that a unique correspondence may be determined, to be specific, an NSI ID or NSSI ID in the correspondence may be determined. Because a correspondence includes an NSI ID or NSSI ID, an NSI ID or NSSI ID may be obtained based on one piece of assistance information, thereby avoiding a case in which a plurality of NSI IDs or NSSI IDs are determined in correspondences by using one piece of S-NSSAI.

For example, as shown in Table 1, a plurality of groups of configuration parameters are stored in the NSSF. A TAI is used as an example of the assistance information. A case in which an NSI ID and an NSSI ID coexist is not shown in Table 1.

When the NSSF receives S-NSSAI of UE, and the S-NSSAI of the UE is S-NSSAI 1, it is found that the S-NSSAI 1 corresponds to an NSI ID 1, an NSI ID 2, and an NSI ID 3. In this case, the NSSF further obtains a current location of the UE, and obtains a TAI 3. Therefore, the NSSF selects a correspondence or selects an NSI ID based on the TAI 3, and determines that the NSI ID corresponding to the UE is the NSI ID 3, so that the NSSF may select a unique NSI for the UE based on the NSI ID 3. An NSSI selection process is similar to the NSI selection process. In this way, a unique NSI and/or NSSI can be selected for the UE by using the assistance information and the correspondence.

TABLE 1

| Network slice instance identifier/Network slice subnet instance identifier | Single network slice selection assistance information | Tracking area identity |
|---|---|---|
| NSI ID 1/NSSI ID 1 | S-NSSAI 1 | TAI 1 |
| NSI ID 2/NSSI ID 2 | S-NSSAI 1 | TAI 2 |
| NSI ID 3/NSSI ID 3 | S-NSSAI 1 | TAI 3 |

Step 404: The NSSF sends the configuration result to the NSMAO.

After obtaining the configuration result, the NSSF sends the configuration result to the NSMAO, so that the NSMAO obtains the configuration result. Because the configuration result indicates a completion status of configuring the configuration parameter by the NSSF, the NSMAO may perform a corresponding operation based on the configuration result.

For step 404 and the corresponding operation performed by the NSMAO based on the configuration result, refer to the foregoing specific descriptions of step 304.

It may be understood that, in some embodiments of the present invention, step 404 may not be included, or step 403 and step 404 may not be included.

In conclusion, the NSSF obtains the configuration parameter sent by the NSMAO, the configuration parameter includes the correspondence, and the correspondence is a correspondence between S-NSSAI and an NSI ID and/or a correspondence between the S-NSSAI and an NSSI ID. The configuration parameter further includes the assistance information. The configuration parameter is used to instruct the NSSF to select, based on the configuration parameter, an NSI and/or NSSI for S-NSSAI provided by user equipment. The NSSF may perform a corresponding operation by using the configuration parameter, to implement more functions. For example, when the NSSF obtains S-NSSAI sent by UE, the NSSF may query, based on the S-NSSAI sent by the UE, the correspondence in the configured configuration parameter. If the S-NSSAI sent by the UE matches the S-NSSAI in the correspondence, the NSSF may determine a unique NSI ID and/or NSSI ID in the correspondence, and then may select a unique NSI and/or NSSI for the UE based on the determined NSI ID and/or NSSI ID. In this way, by obtaining the configuration parameter sent by the NSMAO, the NSSF has a function of selecting a network slice instance and/or network slice subnet instance for S-NSSAI of UE.

The configuration parameter not only includes the correspondence between S-NSSAI and an NSI ID and/or the correspondence between the S-NSSAI and an NSSI ID, but also includes the corresponding assistance information. Therefore, a correspondence between each NSI ID/NSSI ID and S-NSSAI may be determined based on the correspondence, and the assistance information may further be used to assist in NSI/NSSI selection. For example, the NSSF determines a correspondence in a plurality of correspondences by using the assistance information, to determine an NSI ID and/or NSSI ID in the determined correspondence. In this way, the network management method in this embodiment of the present invention is applicable to the scenarios shown in FIG. 1.

The network management method in the foregoing embodiment is applicable to a non-roaming scenario and a roaming scenario. This is not specifically limited in this embodiment of the present invention. The following describes in more detail a case in which the network management method in this embodiment of the present invention is applied to a roaming scenario.

Figure 5:
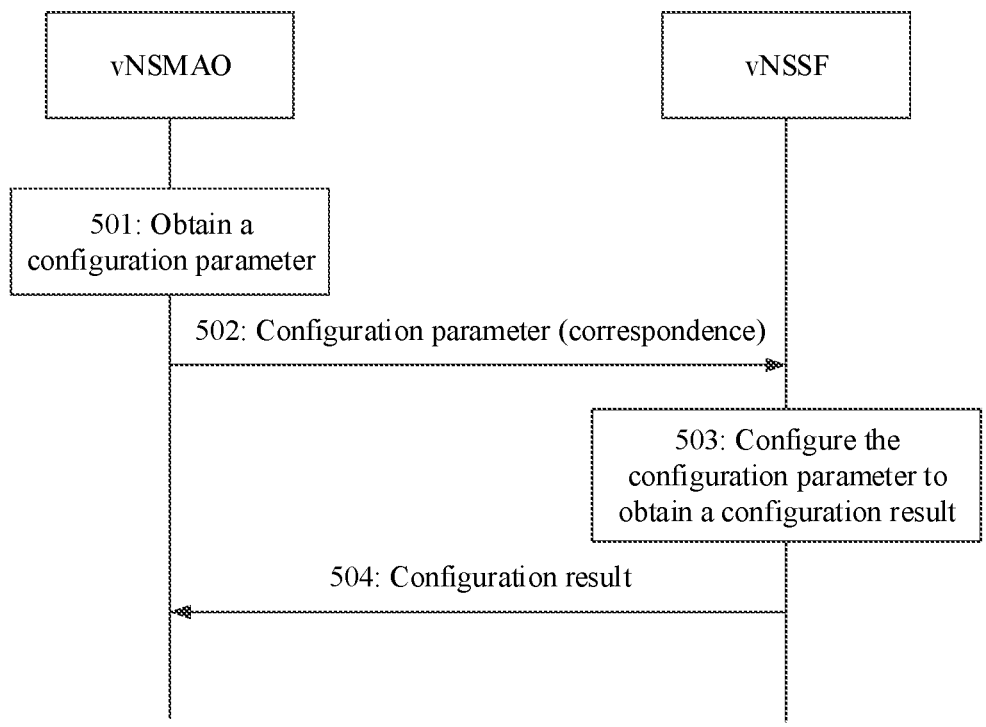
FIG. 5 is a method flowchart of a network management method according to another embodiment of the present invention.

FIG. 5 is a method flowchart of a network management method according to an embodiment of the present invention. The network management method is applicable to the network architecture shown in FIG. 2. An application scenario of the network management method is a roaming scenario.

In a roaming scenario, an NSMAO in a visited public land mobile network (VPLMN) is referred to as a vNSMAO, an NSI/NSSI managed by the vNSMAO is referred to as a vNSI/vNSSI, an NSSF managed by the vNSMAO is referred to as a vNSSF, and S-NSSAI managed by the vNSMAO is referred to as vS-NSSAI. S-NSSAI located in a home public land mobile network (HPLMN) is referred to as hS-NSSAI.

Referring to the foregoing detailed descriptions of the embodiments and the detailed descriptions of the technical terms, and referring to FIG. 5, the network management method in this embodiment of the present invention includes the following steps.

Step 501: The vNSMAO obtains a configuration parameter.

The configuration parameter includes a correspondence, and the correspondence is a correspondence between network slice-related identifiers. Specifically, the correspondence is a correspondence between vS-NSSAI and a vNSI ID and/or a correspondence between the vS-NSSAI and a vNSSI ID; and the correspondence further includes hS-NSSAI, and the hS-NSSAI is S-NSSAI in the HPLMN. The hS-NSSAI may be obtained from a roaming agreement between the VPLMN and the HPLMN, or may be obtained by the vNSMAO from an hNSMAO. After obtaining the hS-NSSAI, the vNSSF maps the hS-NSSAI to the vS-NSSAI.

In this embodiment of the present invention, the NSMAO is located in the VPLMN, so that the NSMAO is referred to as a vNSMAO. The NSSF is located in the VPLMN, so that the NSSF is referred to as a vNSSF. The S-NSSAI is located in the VPLMN, so that the S-NSSAI is referred to as vS-NSSAI. An NSI identified by the NSI ID is located in the VPLMN, so that the NSI ID is referred to as a vNSI ID. An NSSI identified by the NSSI ID is located in the VPLMN, so that the NSSI ID is referred to as a vNSSI ID. The NSI ID is used to identify a network slice instance, and the NSSI ID is used to identify a network slice subnet instance. In this embodiment of the present invention, the NSI ID and the NSSI ID are managed by the vNSMAO. The vS-NSSAI in the correspondence is managed by the vNSMAO.

There are a plurality of specific parameters about the correspondence, for example, as shown in the following descriptions:

In some embodiments of the present invention, the correspondence is a correspondence between a vNSI ID, vS-NSSAI, and hS-NSSAI.

In still some embodiments of the present invention, the correspondence is a correspondence between a vNSSI ID, vS-NSSAI, and hS-NSSAI.

In still some embodiments of the present invention, the correspondence is a correspondence between a vNSI ID, a vNSSI ID, vS-NSSAI, and hS-NSSAI.

For a specific case of step 501, refer to the specific descriptions of step 301. The NSMAO in step 301 is the vNSMAO in step 501. However, in step 501, the NSMAO is located in the VPLMN, so that the NSMAO is referred to as a vNSMAO. Similarly, the NSI ID and/or NSSI ID in step 301 are/is the vNSI ID and/or vNSSI ID in step 501, and the S-NSSAI in step 301 is the vS-NSSAI in step 501.

For a specific method for obtaining the configuration parameter by the vNSMAO, refer to the specific manner of obtaining the configuration parameter by the NSMAO in step 301. A specific form of the correspondence is also the same as that in the descriptions of step 301.

Step 502: The vNSMAO sends the configuration parameter to the vNSSF.

After obtaining the configuration parameter, the vNSMAO may send the configuration parameter to the vNSSF. The vNSSF obtains the configuration parameter sent by the vNSMAO, to be specific, obtains the correspondence in step 501. The configuration parameter is used to instruct the NSSF to select, based on the configuration parameter, an NSI and/or NSSI for S-NSSAI provided by user equipment.

The NSSF is managed by the NSM in the VPLMN, so that the NSSF is referred to as a vNSSF in this embodiment of the present invention.

For example, the vNSM sends a management request for a vNSI/NSSI to the vNSSF, the management request includes at least one group of configuration parameters, and the configuration parameter is a correspondence between a vNSI ID/vNSSI ID, vS-NSSAI, and hS-NSSAI.

It may be understood that, if a plurality of correspondences need to be configured, the vNSM may separately send a plurality of management requests to the vNSSF, and each management request includes a group of configuration parameters. In some implementations, the vNSM may alternatively send a management request to the vNSSF, and the management request includes a plurality of groups of different configuration parameters.

After the vNSSF obtains the configuration parameter, the configuration parameter is used to instruct the vNSSF to select, based on the configuration parameter, a vNSI and/or vNSSI for vS-NSSAI provided by user equipment. For example, the vNSSF obtains vS-NSSAI provided by UE, and then matches the vS-NSSAI in the correspondence in the configuration parameter and the vS-NSSAI provided by the UE; and if the matching succeeds, the vNSSF may determine a vNSI ID and/or vNSSI ID in the correspondence, so that the NSSF obtains an NSI and/or NSSI through selection based on the determined vNSI ID/vNSSI ID.

In this embodiment of the present invention, the correspondence in the configuration parameter further includes hS-NSSAI. Therefore, the vNSSF obtains hS-NSSAI provided by UE, and then matches the hS-NSSAI in the correspondence in the configuration parameter and the hS-NSSAI provided by the UE. If the matching succeeds, a vNSI ID and/or vNSSI ID may be determined in the correspondence, so that the NSSF obtains an NSI and/or NSSI through selection based on the determined vNSI ID/vNSSI ID.

Step 503: The vNSSF configures the configuration parameter to obtain a configuration result.

The configuration result is used to indicate a completion status of configuring the configuration parameter by the vNSSF.

After the vNSSF obtains the configuration parameter sent by the vNSMAO, the vNSSF may configure the configuration parameter, to prepare for subsequent use of the configuration parameter.

Specific configuration manner: For example, there are one or more mapping tables on the vNSSF, and after receiving the management request from the NSM, the vNSSF writes the correspondence in the management request to the mapping table.

After configuring the configuration parameter, the vNSSF may obtain the configuration result. The configuration result is used to indicate a completion status of configuring the configuration parameter by the vNSSF. For example, the configuration result includes one of configuration success information, configuration failure information, and information indicating success of partial configuration.

For descriptions of the configuration operation and the configuration result, refer to the detailed descriptions of step 303.

It may be understood that, in some embodiments of the present invention, the vNSSF may configure the configuration parameter, and the vNSSF may not obtain the configuration result. To be specific, in some embodiments, step 503 is as follows: The vNSSF configures the configuration parameter.

After the vNSSF configures the configuration parameter, a manner of using the configuration parameter may be as follows: When roaming UE accesses a roaming network, the UE provides vS-NSSAI or hS-NSSAI to the vNSSF. Based on execution of the foregoing steps in this embodiment of the present invention, to be specific, the vNSMAO configures a correspondence between vS-NSSAI, hS-NSSAI, and a vNSI ID and/or a correspondence between vS-NSSAI, hS-NSSAI, and a vNSSI ID for the vNSSF, and stores the correspondence in the vNSSF. The vNSSF queries the stored correspondence by using the vS-NSSAI or the hS-NSSAI provided by the UE. When the vS-NSSAI or the hS-NSSAI in the correspondence matches the vS-NSSAI or the hS-NSSAI provided by the UE, the vNSSF may determine a vNSI ID and/or vNSSI ID in the correspondence. Because a network slice instance is identified by using a unique NSI ID, and a network slice subnet instance is identified by using a unique NSSI ID, the NSSF can select a unique NSI/NSSI for the UE based on the determined vNSI ID and/or vNSSI ID.

Step 504: The vNSSF sends the configuration result to the vNSMAO.

After the vNSSF obtains the configuration result, the vNSSF may send the configuration result to the vNSMAO, so that the vNSMAO obtains the configuration result.

For example, after managing the configuration parameter based on the management request including the configuration parameter, the vNSSF sends a management response to the vNSMAO to feed back the configuration result.

The configuration result is used to indicate a completion status of configuring the configuration parameter by the NSSF. Therefore, the vNAMAO may perform a corresponding operation based on the configuration result. For a specific corresponding operation to be performed, refer to the detailed descriptions of step 304.

It may be understood that, in some embodiments of the present invention, step 504 may not be included, or step 503 and step 504 may not be included.

In conclusion, the vNSMAO is an NSMAO in a VPLMN, and the vNSSF obtains the configuration parameter sent by the vNSMAO. The configuration parameter includes the correspondence, and the correspondence is a correspondence between a vNSI ID, vS-NSSAI, and hS-NSSAI and/or a correspondence between a vNSSI ID, vS-NSSAI, and hS-NSSAI. The configuration parameter is used to instruct the NSSF to select, based on the configuration parameter, an NSI and/or NSSI for S-NSSAI provided by user equipment. The vNSSF may perform a corresponding operation by using the configuration parameter, to implement more functions. For example, when the vNSSF obtains vS-NSSAI or hS-NSSAI sent by roaming UE, the vNSSF may query the correspondence in the configuration parameter based on the vS-NSSAI or the hS-NSSAI sent by the UE. If the vS-NSSAI or the hS-NSSAI sent by the UE matches the vS-NSSAI or the hS-NSSAI in the correspondence, the NSSF may determine a unique vNSI ID and/or vNSSI ID in the correspondence, and then may select a unique vNSI and/or vNSSI for the UE based on the determined vNSI ID and/or vNSSI ID. In this way, by obtaining the configuration parameter sent by the vNSMAO, the vNSSF has a function of selecting a network slice instance and/or network slice subnet instance for S-NSSAI of UE, thereby resolving a problem of selecting a network slice instance/network slice subnet instance in a roaming scenario.

Figure 6:
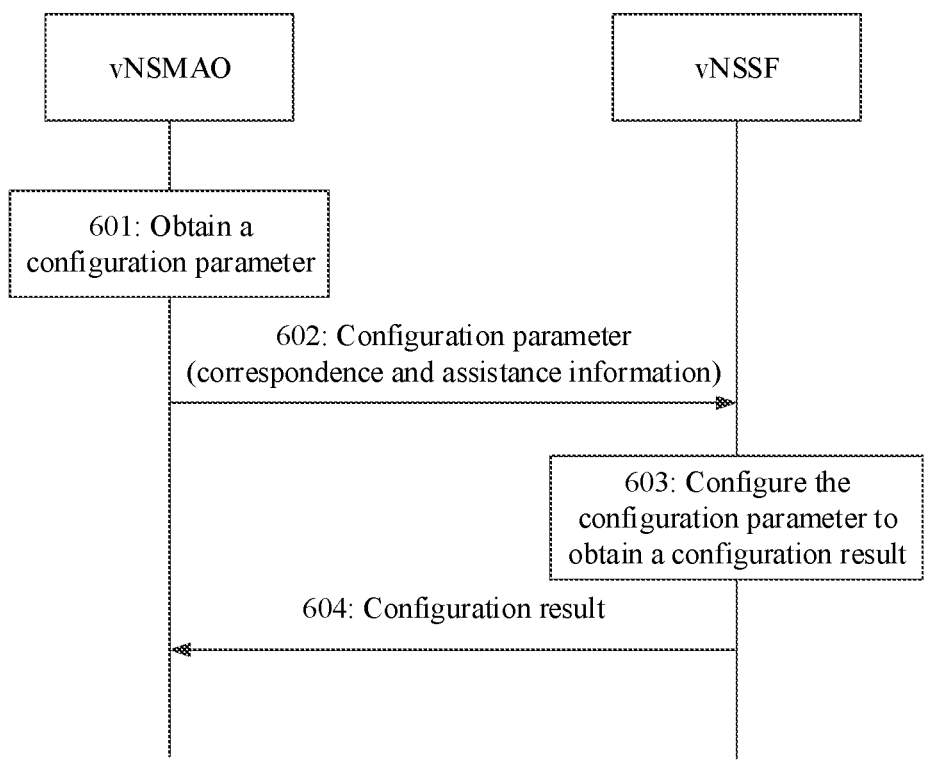
FIG. 6 is a method flowchart of a network management method according to another embodiment of the present invention.

FIG. 6 is a method flowchart of a network management method according to an embodiment of the present invention. The network management method is applicable to the network architecture shown in FIG. 2. The network management method in the embodiment shown in FIG. 6 is also applied to a roaming scenario. The method is a further improvement on the method in the embodiment shown in FIG. 5, and assistance information is applied to the method in the embodiment shown in FIG. 6.

In the scenario of the embodiment shown in FIG. 6, one piece of vS-NSSAI may point to a plurality of vNSIs/vNSSIs, to be specific, there may be a plurality of network slice instances/network slice subnet instances for same vS-NSSAI. Alternatively, a plurality of pieces of vS-NSSAI may point to a same vNSI/vNSSI, to be specific, one network slice instance/network slice subnet instance may serve a plurality of pieces of vS-NSSAI.

When one piece of vS-NSSAI points to a plurality of vNSIs/vNSSIs, or a plurality of pieces of vS-NSSAI point to one vNSI/vNSSI, there are correspondences between the same vS-NSSAI and the plurality of vNSI IDs/vNSSI IDs or correspondences between the plurality of pieces of vS-NSSAI and the same vNSI ID/vNSSI ID. In this case, assistance information needs to be introduced to instruct the NSSF to select a correspondence, to be specific, the vNSSF selects a correspondence between S-NSSAI, h-NSSAI, and an NSI ID/NSSI ID from preset correspondences based on the assistance information. The preset correspondences include: correspondences between one piece of vS-NSSAI and a plurality of vNSI IDs/vNSSI IDs and correspondences between a plurality of pieces of vS-NSSAI and a same vNSI ID/vNSSI ID.

Referring to the foregoing detailed descriptions of the embodiments and the detailed descriptions of technical terms, and referring to FIG. 6, the network management method in this embodiment of the present invention includes the following steps.

Step 601: The vNSMAO obtains a configuration parameter.

The configuration parameter includes a correspondence, and the correspondence is a correspondence between network slice-related identifiers. Specifically, the correspondence is a correspondence between hS-NSSAI, vS-NSSAI, and a vNSI ID and/or a correspondence between hS-NSSAI, vS-NSSAI, and a vNSSI ID.

In this embodiment of the present invention, the NSMAO is located in the VPLMN, so that the NSMAO is referred to as a vNSMAO. The NSSF and the S-NSSAI are located in the VPLMN, so that the NSSF is referred to as a vNSSF, and the S-NSSAI is referred to as vS-NSSAI. An NSI identified by the NSI ID is located in the VPLMN, so that the NSI ID is referred to as a vNSI ID. An NSSI identified by the NSSI ID is located in the VPLMN, so that the NSSI ID is referred to as a vNSSI ID. The NSI ID is used to identify a network slice instance, and the NSSI ID is used to identify a network slice subnet instance. In this embodiment of the present invention, the NSI ID and the NSSI ID are managed by the vNSMAO. The vS-NSSAI in the correspondence is managed by the vNSMAO.

The hS-NSSAI included in the correspondence is S-NSSAI located in an HPLMN.

The NSMAO is located in the VPLMN, so that the NSMAO is referred to as a vNSMAO. The NSI, the NSSI, and the S-NSSAI in the correspondence are managed by the NSMAO in the VPLMN, so that the NSI ID is referred to as a vNSI ID, the NSSI ID is referred to as a vNSSI ID, and the S-NSSAI is referred to as vS-NSSAI.

For the correspondence and a specific implementation of step 601, refer to the specific descriptions of step 501.

In this embodiment of the present invention, the configuration parameter further includes assistance information, and the assistance information corresponds to the correspondence. Specifically, assistance information and a correspondence that belong to a same configuration parameter correspond to each other. After the vNSSF obtains the configuration parameter, the assistance information is used to instruct the vNSSF to select the correspondence.

The assistance information has a plurality of specific forms. For example, the assistance information includes one or any combination of access technology information, location information, priority information, and AMF information.

The details are as follows:

In some embodiments of the present invention, the assistance information is the access technology information, and the access technology information is used to indicate an access technology used when a user access device accesses a network slice instance and/or network slice subnet instance.

In some embodiments of the present invention, the assistance information may be the location information. For example, the location information includes a tracking area identity TAI and/or a routing area identity RAI.

In some embodiments of the present invention, the assistance information may be the priority information. The priority information is used to indicate a priority of the correspondence. When there are a plurality of correspondences, and there is same S-NSSAI but different NSI IDs/NSSI IDs in the plurality of correspondences, a case in which a plurality of NSI IDs/NSSI IDs correspond to one piece of S-NSSAI occurs. In this case, a correspondence whose corresponding priority information indicates a high priority is preferentially used.

In some embodiments of the present invention, the assistance information may be the AMF information, and the AMF information includes one or any combination of an AMF set identifier (such as an AMF set ID), an AMF identifier (such as an AMF ID), and an AMF selection rule.

In some embodiments of the present invention, the assistance information is the AMF identifier and the AMF selection rule. To be specific, when the assistance information includes the AMF identifier, the assistance information may further include the AMF selection rule and the like.

Certainly, in still some embodiments of the present invention, the assistance information may be any combination of the access technology information, the location information, the priority information, and the AMF information.

Step 602: The vNSMAO sends the configuration parameter to the vNSSF.

After obtaining the configuration parameter, the vNSMAO may send the configuration parameter to the vNSSF. The vNSSF obtains the configuration parameter sent by the vNSMAO, to be specific, obtains the correspondence and the assistance information in step 601. The configuration parameter is used to instruct the NSSF to select, based on the configuration parameter, an NSI and/or NSSI for S-NSSAI provided by user equipment.

The configuration parameter includes the correspondence and the assistance information, and the correspondence is a correspondence between a vNSI ID, vS-NSSAI, and hS-NSSAI and/or a correspondence between a vNSSI ID, vS-NSSAI, and hS-NSSAI. When the configuration parameter includes the assistance information and the correspondence, the assistance information in the configuration parameter and the correspondence in the configuration parameter correspond to each other.

The NSSF is managed by an NSM in the VPLMN, so that the NSSF is referred to as a vNSSF in this embodiment of the present invention.

For example, the vNSM sends a management request for a vNSI/vNSSI to the vNSSF, the management request includes at least one group of configuration parameters, the configuration parameter includes a correspondence and assistance information, the correspondence corresponds to the assistance information, and the correspondence is a correspondence between a vNSI ID, vS-NSSAI, and hS-NSSAI and/or a correspondence between a vNSSI ID, vS-NSSAI, and hS-NSSAI.

It may be understood that, if a plurality of correspondences need to be configured, the vNSM may separately send a plurality of management requests to the vNSSF, and each management request includes a group of configuration parameters. In some implementations, the vNSM may alternatively send a management request to the vNSSF, and the management request includes a plurality of groups of different configuration parameters.

Step 603: The vNSSF configures the configuration parameter to obtain a configuration result.

The configuration result is used to indicate a completion status of configuring the configuration parameter by the vNSSF.

After the vNSSF obtains the configuration parameter sent by the vNSMAO, the vNSSF may configure the configuration parameter, to prepare for subsequent use of the configuration parameter.

For a specific implementation of step 603, refer to the specific descriptions of step 503. However, in this embodiment of the present invention, the vNSSF configures the correspondence and the assistance information.

It may be understood that, in some embodiments of the present invention, the vNSSF may configure the configuration parameter, and the vNSSF may not obtain the configuration result. To be specific, in some embodiments, step 603 is as follows: The vNSSF configures the configuration parameter.

After the vNSSF configures the configuration parameter, a manner of using the configuration parameter may be described in step 503. Because the assistance information is further included in this embodiment of the present invention, when the vNSSF may store a plurality of correspondences that have same vS-NSSAI or hS-NSSAI, if vS-NSSAI or hS-NSSAI provided by roaming UE is the same as the vS-NSSAI or hS-NSSAI in the plurality of correspondences, the vNSSF may determine a correspondence by using the assistance information, to determine a vNSI ID and/or vNSSI ID in the determined correspondence. For a specific example, refer to the descriptions of step 403.

Step 604: The vNSSF sends the configuration result to the vNSMAO.

After the vNSSF obtains the configuration result, the vNSSF may send the configuration result to the vNSMAO, so that the vNSMAO obtains the configuration result.

For example, after managing the configuration parameter based on the management request including the configuration parameter, the vNSSF sends a management response to the vNSMAO to feed back the configuration result.

The configuration result is used to indicate a completion status of configuring the configuration parameter by the NSSF. Therefore, the vNAMAO may perform a corresponding operation based on the configuration result. For a specific corresponding operation to be performed, refer to the detailed descriptions of step 304.

It may be understood that, in some embodiments of the present invention, step 604 may not be included, or step 603 and step 604 may not be included.

In conclusion, the vNSMAO is an NSMAO in a VPLMN, and the vNSSF obtains the configuration parameter sent by the vNSMAO. The configuration parameter includes the correspondence, and the correspondence is a correspondence between a vNSI ID, vS-NSSAI, and hS-NSSAI and/or a correspondence between a vNSSI ID, vS-NSSAI, and hS-NSSAI. The configuration parameter is used to instruct the NSSF to select, based on the configuration parameter, an NSI and/or NSSI for S-NSSAI provided by user equipment. The vNSSF may perform a corresponding operation by using the configuration parameter, to implement more functions. For example, when the vNSSF obtains vS-NSSAI or hS-NSSAI sent by roaming UE, the vNSSF may query the correspondence in the configured configuration parameter based on the vS-NSSAI or the hS-NSSAI sent by the UE. If the vS-NSSAI or the hS-NSSAI sent by the UE matches the vS-NSSAI or the hS-NSSAI in the correspondence, the NSSF may determine a unique vNSI ID and/or vNSSI ID in the correspondence, and then may select a unique vNSI and/or vNSSI for the UE based on the determined vNSI ID and/or vNSSI ID. In this way, by obtaining the configuration parameter sent by the vNSMAO, the vNSSF has a function of selecting a network slice instance and/or network slice subnet instance for S-NSSAI of UE.

The configuration parameter not only includes the correspondence, but also includes the corresponding assistance information. Therefore, a correspondence between each vNSI ID/vNSSI ID, vS-NSSAI and hS-NSSAI may be determined based on the correspondence, and the assistance information may further be used to assist in vNSI/vNSSI selection. For example, the vNSSF determines a correspondence in a plurality of correspondences by using the assistance information, to determine a vNSI ID and/or vNSSI ID in the determined correspondence. In this way, the network management method in this embodiment of the present invention is applicable to the scenarios shown in FIG. 1.

Figure 7:
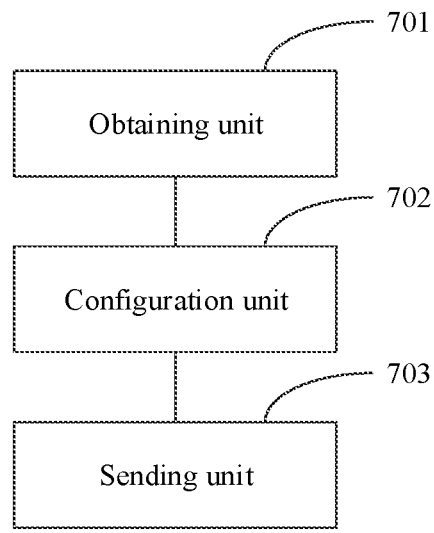
FIG. 7 is a schematic structural diagram of a network slice selection function according to another embodiment of the present invention.

FIG. 7 is a schematic structural diagram of a network slice selection function according to an embodiment of the present invention. The network slice selection function may perform the steps performed by the network slice selection function in the network management method according to the foregoing embodiments.

Referring to FIG. 7, the network slice selection function according to this embodiment of the present invention includes:

an obtaining unit 701, configured to obtain a configuration parameter sent by an NSMAO, where the configuration parameter includes a correspondence, the correspondence is a correspondence between single network slice selection assistance information S-NSSAI and a network slice instance identifier NSI ID and/or a correspondence between the S-NSSAI and a network slice subnet instance identifier NSSI ID, and the configuration parameter is used to instruct the NSSF to select, based on the configuration parameter, an NSI and/or NSSI for S-NSSAI provided by user equipment.

Optionally:

the NSMAO, the NSSF, and the S-NSSAI are located in a VPLMN, and an NSI identified by the NSI ID and/or an NSSI identified by the NSSI ID are/is located in the VPLMN; and the correspondence further includes hS-NSSAI, and the hS-NSSAI is S-NSSAI in an HPLMN.

Optionally:

the configuration parameter further includes assistance information, the assistance information corresponds to the correspondence, and the assistance information is used to instruct the NSSF to select the correspondence.

Optionally:

the assistance information includes one or any combination of access technology information, location information, priority information, and access and mobility management function AMF information, where the access technology information is used to indicate an access technology used when a user access device accesses a network slice instance and/or network slice subnet instance;

the location information includes a tracking area identity TAI and/or a routing area identity RAI;

the priority information is used to indicate a priority of the correspondence; and the AMF information includes one or any combination of an AMF set identifier, an AMF identifier, and an AMF selection rule.

Optionally:

the network slice selection function according to this embodiment of the present invention further includes:

a configuration unit 702, configured to configure the configuration parameter to obtain a configuration result, where the configuration result is used to indicate a completion status of configuring the configuration parameter by the NSSF; and a sending unit 703, configured to send the configuration result to the NSMAO.

Optionally:

the NSMAO is one or any combination of a network manager NM, a domain manager DM, an element manager EM, a network slice management function NSMF, a network slice subnet management function NSSMF, a communications service management function CSMF, a network function virtualization orchestration NFVO, and a virtualized network function manager VNFM.

In conclusion, the obtaining unit 701 obtains the configuration parameter sent by the NSMAO, where the configuration parameter includes the correspondence, the correspondence is a correspondence between single network slice selection assistance information S-NSSAI and a network slice instance identifier NSI ID and/or a correspondence between the S-NSSAI and a network slice subnet instance identifier NSSI ID, and the configuration parameter is used to instruct the NSSF to select, based on the configuration parameter, the NSI and/or NSSI for the S-NSSAI provided by the user equipment. The NSSF may perform a corresponding operation by using the configuration parameter, to implement more functions. For example, when the NSSF obtains S-NSSAI sent by UE, the NSSF may query, based on the S-NSSAI sent by the UE, the correspondence in the configured configuration parameter. If the S-NSSAI sent by the UE matches the S-NSSAI in the correspondence, the NSSF may determine a unique NSI ID and/or NSSI ID in the correspondence, and then may select a unique NSI and/or NSSI for the UE based on the determined NSI ID and/or NSSI ID. In this way, by obtaining the configuration parameter sent by the NSMAO, the NSSF has a function of selecting a network slice instance and/or network slice subnet instance for S-NSSAI of UE.

Figure 8:
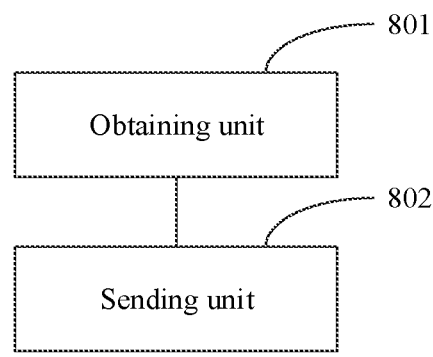
FIG. 8 is a schematic structural diagram of a network slice management and orchestration according to another embodiment of the present invention.

FIG. 8 is a schematic structural diagram of a network slice management and orchestration according to an embodiment of the present invention. The network slice management and orchestration may be configured to perform the steps performed by the network slice management and orchestration in the foregoing embodiments.

Referring to FIG. 8, the network slice management and orchestration according to this embodiment of the present invention includes:

an obtaining unit 801, configured to obtain a configuration parameter, where the configuration parameter includes a correspondence, and the correspondence is a correspondence between S-NSSAI and an NSI ID and/or a correspondence between the S-NSSAI and an NSSI ID; and a sending unit 802, configured to send the configuration parameter to an NSSF.

Optionally:

the NSMAO, the NSSF, and the S-NSSAI are located in a VPLMN, and an NSI identified by the NSI ID and/or an NSSI identified by the NSSI ID are/is located in the VPLMN; and the correspondence further includes hS-NSSAI, and the hS-NSSAI is S-NSSAI in an HPLMN.

Optionally:

the configuration parameter further includes assistance information, the assistance information corresponds to the correspondence, and the assistance information is used to instruct the NSSF to select the correspondence.

Optionally:

the assistance information includes one or any combination of access technology information, location information, priority information, and access and mobility management function AMF information, where the access technology information is used to indicate an access technology used when a user access device accesses a network slice instance and/or network slice subnet instance;

the location information includes a tracking area identity TAI and/or a routing area identity RAI;

the priority information is used to indicate a priority of the correspondence; and the AMF information includes one or any combination of an AMF set identifier, an AMF identifier, and an AMF selection rule.

Optionally:

the obtaining unit 801 is further configured to obtain a configuration result sent by the NSSF, where the configuration result is used to indicate a completion status of configuring the configuration parameter by the NSSF.

Optionally:

the NSMAO is one or any combination of a network manager NM, a domain manager DM, an element manager EM, a network slice management function NSMF, a network slice subnet management function NSSMF, a communications service management function CSMF, a network function virtualization orchestration NFVO, and a virtualized network function manager VNFM.

In conclusion, the obtaining unit 801 obtains the configuration parameter, where the configuration parameter includes the correspondence, and the correspondence is a correspondence between S-NSSAI and an NSI ID and/or a correspondence between the S-NSSAI and an NSSI ID. The sending unit 802 sends the configuration parameter to the NSSF. The NSMAO sends the configuration parameter to the NSSF, so that the NSSF performs a corresponding operation based on the configuration parameter. For example, the configuration parameter is used to instruct the NSSF to select, based on the configuration parameter, an NSI and/or NSSI for S-NSSAI provided by user equipment. After obtaining the configuration parameter, the NSSF may configure the configuration parameter, to perform a corresponding operation by using the configuration parameter, thereby implementing more functions. For example, when the NSSF obtains S-NSSAI sent by UE, the NSSF may query, based on the S-NSSAI sent by the UE, the correspondence in the configured configuration parameter, to determine a unique NSI ID and/or NSSI ID in the correspondence; and then the NSSF may select a unique NSI and/or NSSI for the UE based on the determined NSI ID and/or NSSI ID. In this way, by sending the configuration parameter to the NSSF, the NSMAO enables the NSSF to have more functions. In particular, after configuring the configuration parameter, the NSSF is enabled to select a unique NSI and/or NSSI by using the configuration parameter, to be specific, the NSSF is enabled to have a function of selecting a network slice instance and/or network slice subnet instance for S-NSSAI of UE.

Figure 9:
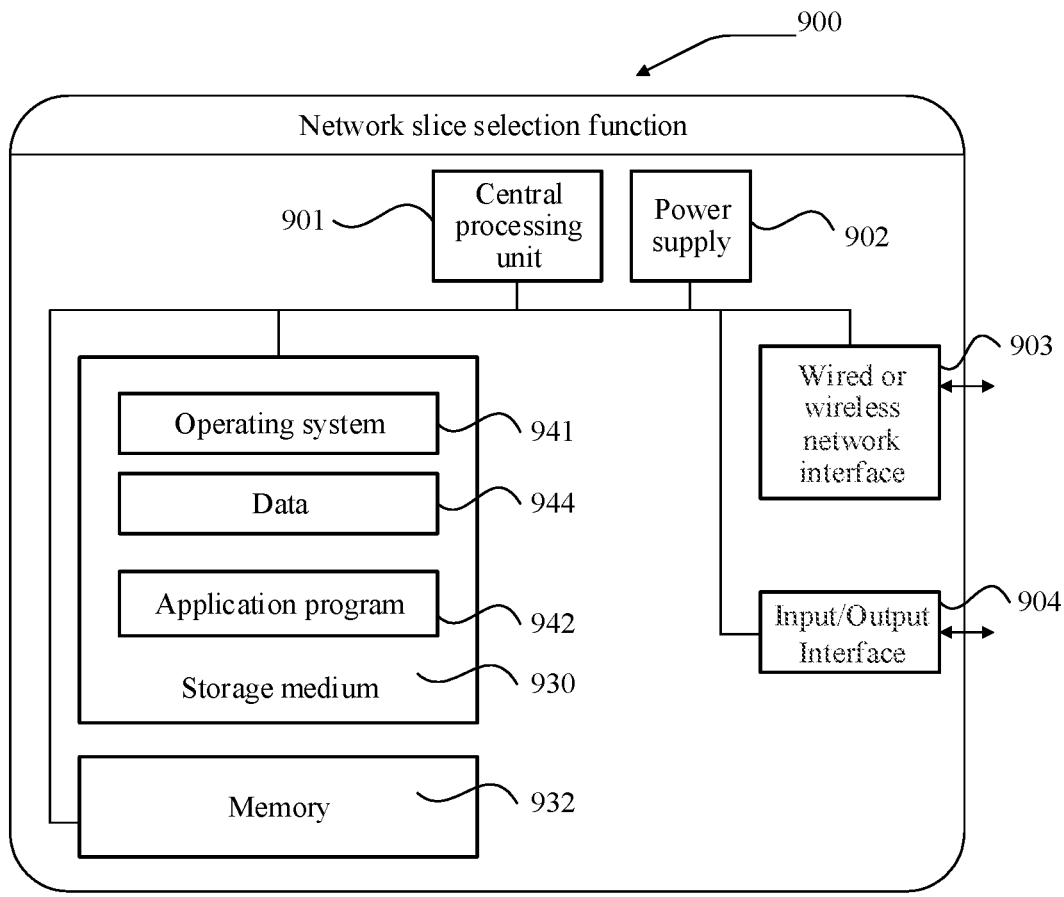
FIG. 9 is a schematic diagram of a hardware structure of a network slice selection function according to another embodiment of the present invention.

FIG. 9 is a schematic diagram of a hardware structure of a network slice selection function according to an embodiment of the present invention. The network slice selection function 900 may differ greatly due to different configurations or different performance, and may include one or more central processing units (CPU) 901 (such as one or more processors), a memory 932, and one or more storage media 930 (such as one or more mass storage devices) storing an application program 942 or data 944. The memory 932 and the storage medium 930 each may be a transient storage or a persistent storage. The program stored in the storage medium 930 may include one or more modules (not shown in the figure), and each module may include a series of instruction operations for the network slice selection function. Further, the central processing unit 901 may be configured to: communicate with the storage medium 930, and perform, on the network slice selection function 900, the series of instruction operations in the storage medium 930.

The network slice selection function 900 may further include one or more power supplies 902, one or more wired or wireless network interfaces 903, one or more input/output interfaces 904, and/or one or more operating systems 941, such as Windows Server™, Mac OS X™, Unix™, Linux™, and FreeBSD™.

The steps performed by the network slice selection function in the foregoing embodiment may be based on the structure of the network slice selection function shown in FIG. 9.

Details are as follows:

The central processing unit 901 has the following functions: obtaining a configuration parameter sent by a network slice management and orchestration NSMAO, where the configuration parameter includes a correspondence, the correspondence is a correspondence between single network slice selection assistance information S-NSSAI and a network slice instance identifier NSI ID and/or a correspondence between the S-NSSAI and a network slice subnet instance identifier NSSI ID, and the configuration parameter is used to instruct the NSSF to select, based on the configuration parameter, an NSI and/or NSSI for S-NSSAI provided by user equipment.

Optionally, the NSMAO, the NSSF, and the S-NSSAI are located in a VPLMN, and an NSI identified by the NSI ID and/or an NSSI identified by the NSSI ID are/is located in the VPLMN; and the correspondence further includes hS-NSSAI, and the hS-NSSAI is S-NSSAI in an HPLMN.

Optionally:

the configuration parameter further includes assistance information, the assistance information corresponds to the correspondence, and the assistance information is used to instruct the NSSF to select the correspondence.

Optionally:

the assistance information includes one or any combination of access technology information, location information, priority information, and access and mobility management function AMF information, where the access technology information is used to indicate an access technology used when a user access device accesses a network slice instance and/or network slice subnet instance;

the location information includes a tracking area identity TAI and/or a routing area identity RAI;

the priority information is used to indicate a priority of the correspondence; and the AMF information includes one or any combination of an AMF set identifier, an AMF identifier, and an AMF selection rule.

Optionally, the central processing unit 901 further has the following functions:

configuring the configuration parameter to obtain a configuration result, where the configuration result is used to indicate a completion status of configuring the configuration parameter by the NSSF; and sending the configuration result to the NSMAO.

Optionally:

the NSMAO is one or any combination of a network manager NM, a domain manager DM, an element manager EM, a network slice management function NSMF, a network slice subnet management function NSSMF, a communications service management function CSMF, a network function virtualization orchestration NFVO, and a virtualized network function manager VNFM.

In conclusion, the central processing unit 901 obtains the configuration parameter sent by the NSMAO, where the configuration parameter includes the correspondence, the correspondence is a correspondence between single network slice selection assistance information S-NSSAI and a network slice instance identifier NSI ID and/or a correspondence between the S-NSSAI and a network slice subnet instance identifier NSSI ID, and the configuration parameter is used to instruct the NSSF to select, based on the configuration parameter, an NSI and/or NSSI for the S-NSSAI provided by the user equipment. The NSSF may perform a corresponding operation by using the configuration parameter, to implement more functions. For example, when the NSSF obtains S-NSSAI sent by UE, the NSSF may query, based on the S-NSSAI sent by the UE, the correspondence in the configured configuration parameter. If the S-NSSAI sent by the UE matches the S-NSSAI in the correspondence, the NSSF may determine a unique NSI ID and/or NSSI ID in the correspondence, and then may select a unique NSI and/or NSSI for the UE based on the determined NSI ID and/or NSSI ID. In this way, by obtaining the configuration parameter sent by the NSMAO, the NSSF has a function of selecting a network slice instance and/or network slice subnet instance for S-NSSAI of UE.

An embodiment of the present invention further provides a network slice management and orchestration. The network slice management and orchestration may differ greatly due to different configurations or different performance, and may include one or more central processing units (CPU) (such as one or more processors), a memory, and one or more storage media (such as one or more mass storage devices) storing an application program or data. The memory and the storage medium each may be a transient storage or a persistent storage. The program stored in the storage medium may include one or more modules (not shown in the figure), and each module may include a series of instruction operations for the network slice selection function. Further, the central processing unit may be configured to: communicate with the storage medium, and perform, on the network slice selection function, the series of instruction operations in the storage medium.

The network slice management and orchestration may further include one or more power supplies, one or more wired or wireless network interfaces, one or more input/output interfaces, and/or one or more operating systems, such as Windows Server™, Mac OS X™, Unix™, Linux™, and FreeBSD™.

For a schematic diagram of specific hardware of the network slice management and orchestration, refer to the schematic diagram of the hardware structure of the network slice selection function shown in FIG. 9.

The steps performed by the network slice management and orchestration in the foregoing embodiment may be based on the structure of network slice management and orchestration provided in this embodiment of the present invention.

Details are as follows:

The central processing unit of the network slice management and orchestration has the following functions:

obtaining a configuration parameter, where the configuration parameter includes a correspondence, and the correspondence is a correspondence between S-NSSAI and an NSI ID and/or a correspondence between the S-NSSAI and an NSSI ID; and sending the configuration parameter to the NSSF.

Optionally:

the NSMAO, the NSSF, and the S-NSSAI are located in a VPLMN, and an NSI identified by the NSI ID and/or an NSSI identified by the NSSI ID are/is located in the VPLMN; and the correspondence further includes hS-NSSAI, and the hS-NSSAI is S-NSSAI in an HPLMN.

Optionally:

the configuration parameter further includes assistance information, the assistance information corresponds to the correspondence, and the assistance information is used to instruct the NSSF to select the correspondence.

Optionally:

the assistance information includes one or any combination of access technology information, location information, priority information, and access and mobility management function AMF information, where the access technology information is used to indicate an access technology used when a user access device accesses a network slice instance and/or network slice subnet instance;

the location information includes a tracking area identity TAI and/or a routing area identity RAI;

the priority information is used to indicate a priority of the correspondence; and the AMF information includes one or any combination of an AMF set identifier, an AMF identifier, and an AMF selection rule.

Optionally, the central processing unit of the network slice management and orchestration further has the following functions:

obtaining a configuration result sent by the NSSF, where the configuration result is used to indicate a completion status of configuring the configuration parameter by the NSSF.

Optionally:

the NSMAO is one or any combination of a network manager NM, a domain manager DM, an element manager EM, a network slice management function NSMF, a network slice subnet management function NSSMF, a communications service management function CSMF, a network function virtualization orchestration NFVO, and a virtualized network function manager VNFM.

In conclusion, the central processing unit of the network slice management and orchestration obtains the configuration parameter, where the configuration parameter includes the correspondence, and the correspondence is a correspondence between S-NSSAI and an NSI ID and/or a correspondence between the S-NSSAI and an NSSI ID. The central processing unit of the network slice management and orchestration sends the configuration parameter to the NSSF, so that the NSSF performs a corresponding operation based on the configuration parameter. For example, the configuration parameter is used to instruct the NSSF to select, based on the configuration parameter, an NSI and/or NSSI for S-NSSAI provided by user equipment. After obtaining the configuration parameter, the NSSF may configure the configuration parameter, to perform a corresponding operation by using the configuration parameter, thereby implementing more functions. For example, when the NSSF obtains S-NSSAI sent by UE, the NSSF may query, based on the S-NSSAI sent by the UE, the correspondence in the configured configuration parameter, to determine a unique NSI ID and/or NSSI ID in the correspondence, and then may select a unique NSI and/or NSSI for the UE based on the determined NSI ID and/or NSSI ID. In this way, the NSMAO sends the configuration parameter to the NSSF, so that the NSSF has more functions. In particular, after configuring the configuration parameter, the NSSF is enabled to select a unique NSI and/or NSSI by using the configuration parameter, to be specific, the NSSF is enabled to have a function of selecting a network slice instance and/or network slice subnet instance for S-NSSAI of UE.

Figure 10:
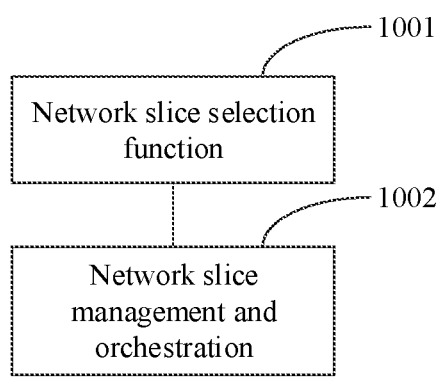
FIG. 10 is a schematic structural diagram of a network system according to another embodiment of the present invention.

FIG. 10 is a schematic structural diagram of a network system according to an embodiment of the present invention.

The network system includes a network slice selection function 1001 and a network slice management and orchestration 1002.

The network slice selection function 1001 is the network slice selection function shown in any one of the embodiments shown in FIG. 2 to FIG. 6, FIG. 7, and FIG. 9. For details, refer to the foregoing examples of the embodiments. Details are not described herein again.

The network slice management and orchestration 1002 is the network slice management and orchestration shown in any one of the embodiments shown in FIG. 2 to FIG. 6, the embodiment shown in FIG. 8, and the embodiment of the hardware structure of the network slice management and orchestration. For details, refer to the foregoing examples of the embodiments. Details are not described herein again.

All or some of the foregoing embodiments may be implemented by using software, hardware, firmware, or any combination thereof. When software is used to implement the embodiments, the embodiments may be implemented completely or partially in a form of a computer program product.

The computer program product includes one or more computer instructions. When the computer program instructions are loaded and executed on a computer, the procedure or functions according to the embodiments of the present invention are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium that can be stored by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

It may be clearly understood by a person skilled in the art that, for the purpose of convenient and brief description, for a detailed working process of the foregoing described system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementations. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions in the embodiments of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the method described in the embodiments of the present invention. The foregoing storage medium includes: any medium that can store program code, such as a USB flash drive, a removable hard disk, a read-only memory (ROM), a random access memory (RAM), a magnetic disk, or an optical disc.

What is claimed is:

1. A network management method, comprising:
obtaining, by a network slice selection function (NSSF), a configuration parameter sent by a network slice management and orchestration module (NSMAO), wherein the configuration parameter comprises a correspondence, wherein the correspondence includes at least one of a correspondence between single network slice selection assistance information (S-NSSAI) and a network slice instance identifier (NSI ID) or a correspondence between the S-NSSAI and a network slice subnet instance identifier (NSSI ID), and wherein the configuration parameter instructs the NSSF to select, based on the configuration parameter, at least one of a network slice instance (NSI) or a network slice subnet instance (NSSI) for S-NSSAI provided by user equipment.

2. The method according to claim 1, wherein:
the NSMAO, the NSSF, and the S-NSSAI are located in a visited public land mobile network (VPLMN), and at least one of an NSI identified by the NSI ID or an NSSI identified by the NSSI ID is located in the VPLMN; and
the correspondence further comprises hS-NSSAI, and the hS-NSSAI is S-NSSAI in a home public land mobile network (HPLMN).

3. The method according to claim 1, wherein the configuration parameter further comprises assistance information, wherein the assistance information corresponds to the correspondence, and wherein the assistance information instructs the NSSF to select the correspondence.

4. The method according to claim 3, wherein the assistance information comprises at least one of access technology information, location information, priority information, or access and mobility management function (AMF) information, and wherein:

the access technology information indicates an access technology used when a user access device accesses at least one of a network slice instance or a network slice subnet instance;

the location information comprises at least one of a tracking area identity (TAI) or a routing area identity (RAI);

the priority information indicates a priority of the correspondence; and the AMF information comprises at least one of an AMF set identifier, an AMF identifier, or an AMF selection rule.

5. The method according to claim 1, wherein after obtaining, by the NSSF, the configuration parameter sent by the NSMAO, the method further comprises:

configuring, by the NSSF, the configuration parameter to obtain a configuration result, wherein the configuration result indicates a completion status of configuring the configuration parameter by the NSSF; and sending, by the NSSF, the configuration result to the NSMAO.

6. The method according to claim 1, wherein the NSMAO includes at least one of a network manager (NM), a domain manager (DM), an element manager (EM), a network slice management function (NSMF), a network slice subnet management function (NSSMF), a communications service management function (CSMF), a network function virtualization orchestration (NFVO), or a virtualized network function manager (VNFM).

7. A network management method, comprising:

obtaining, by a network slice management and orchestration module (NSMAO), a configuration parameter, wherein the configuration parameter comprises a correspondence, and wherein the correspondence includes at least one of a correspondence between single network slice selection assistance information (S-NSSAI) and a network slice instance identifier (NSI ID) or a correspondence between the S-NSSAI and a network slice subnet instance identifier (NSSI ID); and sending, by the NSMAO, the configuration parameter to a network slice selection function (NSSF).

8. The method according to claim 7, wherein:

the NSMAO, the NSSF, and the S-NSSAI are located in a visited public land mobile network (VPLMN), and at least one of an NSI identified by the NSI ID or an NSSI identified by the NSSI ID is located in the VPLMN; and the correspondence further comprises hS-NSSAI, and the hS-NSSAI is S-NSSAI in a home public land mobile network (HPLMN).

9. The method according to claim 7, wherein the configuration parameter further comprises assistance information, wherein the assistance information corresponds to the correspondence, and wherein the assistance information instructs the NSSF to select the correspondence.

10. The method according to claim 9, wherein the assistance information comprises at least one of access technology information, location information, priority information, or access and mobility management function (AMF) information, and wherein:

the access technology information indicates an access technology used when a user access device accesses at least one of a network slice instance or a network slice subnet instance;

the location information comprises at least one of a tracking area identity (TAI) or a routing area identity (RAI);

the priority information indicates a priority of the correspondence; and the AMF information comprises at least one of an AMF set identifier, an AMF identifier, or an AMF selection rule.

11. The method according to claim 7, wherein after sending, by the NSMAO, the configuration parameter to the NSSF, the method further comprises:

obtaining, by the NSMAO, a configuration result sent by the NSSF, wherein the configuration result indicates a completion status of configuring the configuration parameter by the NSSF.

12. The method according to claim 7, wherein the NSMAO includes at least one of a network manager (NM), a domain manager (DM), an element manager (EM), a network slice management function (NSMF), a network slice subnet management function (NSSMF), a communications service management function (CSMF), a network function virtualization orchestration (NFVO), or a virtualized network function manager (VNFM).

13. A network system, wherein the network system comprises a network slice selection function (NSSF) and a network slice management and orchestration module (NSMAO), and wherein the NSMAO is configured to:

obtain a configuration parameter, wherein the configuration parameter comprises a correspondence, and wherein the correspondence includes at least one of a correspondence between single network slice selection assistance information (S-NSSAI) and a network slice instance identifier (NSI ID) or a correspondence between the S-NSSAI and a network slice subnet instance identifier (NSSI ID); and send the configuration parameter to the NSSF.

14. The network system according to claim 13, wherein:

the NSMAO, the NSSF, and the S-NSSAI are located in a visited public land mobile network (VPLMN), and at least one of an NSI identified by the NSI ID or an NSSI identified by the NSSI ID is located in the VPLMN; and the correspondence further comprises hS-NSSAI, and the hS-NSSAI is S-NSSAI in a home public land mobile network (HPLMN).

15. The network system according to claim 13, wherein the configuration parameter further comprises assistance information, wherein the assistance information corresponds to the correspondence, and wherein the assistance information instructs the NSSF to select the correspondence.

16. The network system according to claim 15, wherein the assistance information comprises at least one of access technology information, location information, priority information, and access and mobility management function (AMF) information, or wherein:

the access technology information indicates an access technology used when a user access device accesses at least one of a network slice instance or a network slice subnet instance;

the location information comprises at least one of a tracking area identity (TAI) or a routing area identity (RAI);

the priority information indicates a priority of the correspondence; and the AMF information comprises at least one of an AMF set identifier, an AMF identifier, or an AMF selection rule.

17. The network system according to claim 13, wherein the NSMAO is further configured to:
obtain a configuration result sent by the NSSF, wherein the configuration result indicates a completion status of configuring the configuration parameter by the NSSF.

18. The network system according to claim 13, wherein the NSMAO includes at least one of a network manager (NM), a domain manager (DM), an element manager (EM), a network slice management function (NSMF), a network slice subnet management function (NSSMF), a communications service management function (CSMF), a network function virtualization orchestration (NFVO), or a virtualized network function manager (VNFM).

* * * * *